US009190112B1

(12) United States Patent
Bayang et al.

(10) Patent No.: US 9,190,112 B1
(45) Date of Patent: Nov. 17, 2015

(54) STORING WRITE ENVIRONMENT CONDITIONS

(71) Applicant: International Business Machines Corporation, Armonk, NY (US)

(72) Inventors: Josephine F. Bayang, Tucson, AZ (US); Ernest S. Gale, Tucson, AZ (US); Hirokazu Nakayama, Shiga-ken (JP); Mitsuhiro Nishida, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/334,571

(22) Filed: Jul. 17, 2014

(51) Int. Cl.
*G11B 17/00* (2006.01)
*G11B 27/36* (2006.01)
*G11B 15/675* (2006.01)
*G11B 33/14* (2006.01)
*G11B 15/24* (2006.01)

(52) U.S. Cl.
CPC .............. *G11B 27/36* (2013.01); *G11B 15/675* (2013.01); *G11B 15/24* (2013.01); *G11B 33/14* (2013.01)

(58) Field of Classification Search
None
See application file for complete search history.

(56) References Cited

U.S. PATENT DOCUMENTS

| 5,057,961 | A | * | 10/1991 | Rayis | 360/137 |
|---|---|---|---|---|---|
| 6,661,596 | B2 | | 12/2003 | Chliwnyj et al. | |
| 6,676,026 | B1 | | 1/2004 | McKinley et al. | |
| 7,027,250 | B2 | | 4/2006 | Lau | |
| 8,213,107 | B2 | | 7/2012 | Saliba et al. | |
| 8,711,501 | B2 | | 4/2014 | Childers et al. | |
| 8,941,940 | B1 | | 1/2015 | Bayang et al. | |
| 2003/0067704 | A1 | * | 4/2003 | Woo et al. | 360/69 |
| 2006/0077585 | A1 | * | 4/2006 | Larson | 360/69 |
| 2007/0076316 | A1 | | 4/2007 | Kuse et al. | |
| 2009/0296257 | A1 | | 12/2009 | Nakano et al. | |
| 2012/0243118 | A1 | | 9/2012 | Saliba et al. | |

FOREIGN PATENT DOCUMENTS

JP 6180890 A 6/1994

OTHER PUBLICATIONS

English Abstract of Japanese patent JP6180890.
Bayang et al., "Utilizing Stored Write Environment Conditions for Read Error Recovery", U.S. Appl. No. 14/334,603, filed Jul. 17, 2014.
Bayang at al., U.S. Appl. No. 14/581,207, filed Dec. 23, 2014.

* cited by examiner

*Primary Examiner* — Andrew L Sniezek
(74) *Attorney, Agent, or Firm* — Zilka-Kotab, PC

(57) ABSTRACT

Described are embodiments of an invention for storing write environment conditions of a tape cartridge. A tape drive measures and stores the write environment conditions for a portion of tape as a result of receiving a write command to write data to the same portion of tape. In one embodiment, the write environment conditions are measured and stored to the tape cartridge each time a write command is received such that each portion of tape written has corresponding stored write environment conditions. The write environment conditions include temperature and relative humidity in one embodiment. The stored write environment conditions for each portion of tape written creates a historical log of the environment conditions that the tape was written within. The historical log can provide information to a manufacturer or user regarding the environmental conditions the user operates their tape drive within and provides information to assist with failure analysis.

20 Claims, 9 Drawing Sheets

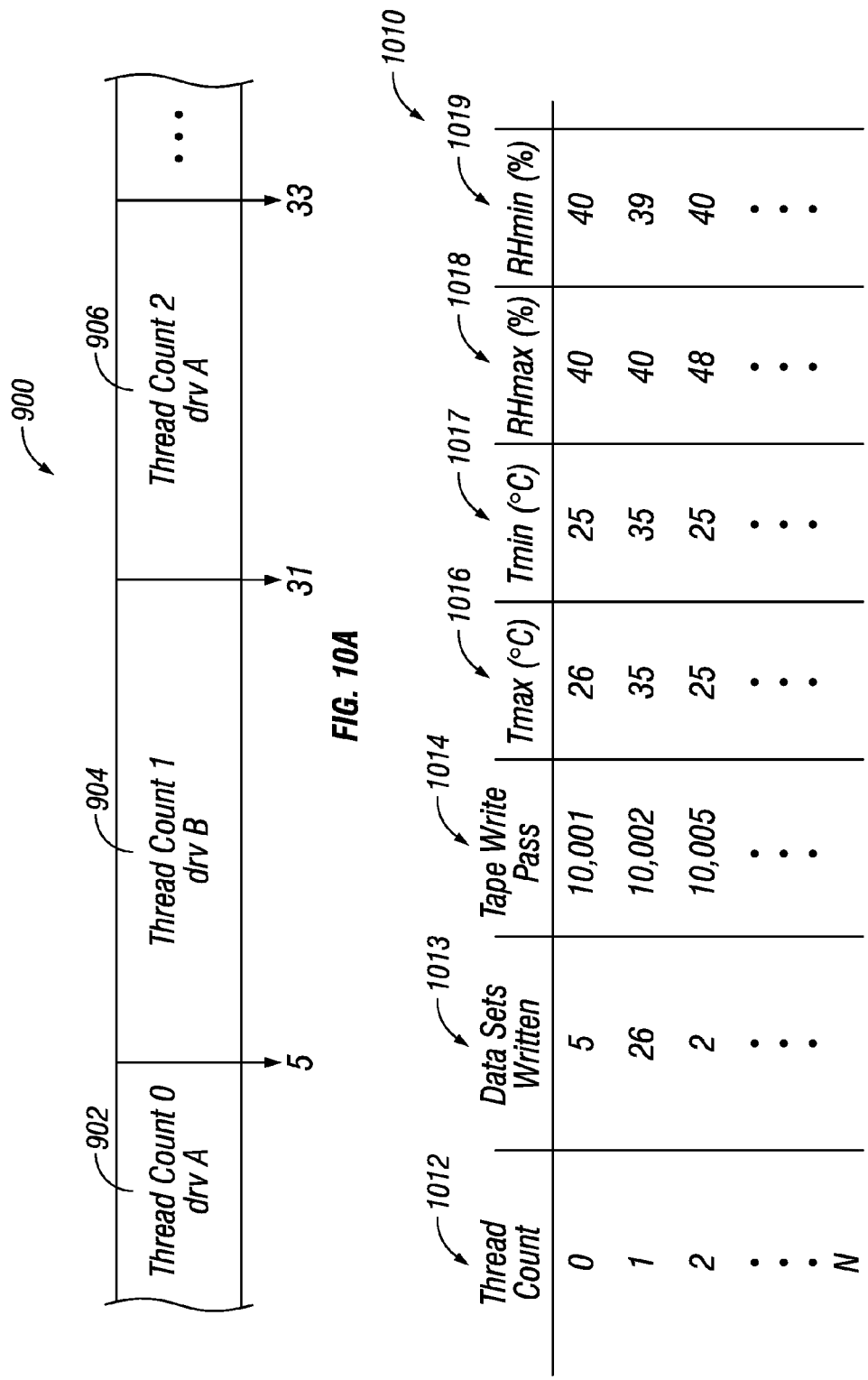

STORING WRITE ENVIRONMENT CONDITIONS

TECHNICAL FIELD

This invention generally relates to tape drives for moving an elongate tape between a supply reel and a take-up reel, for example for writing and reading data on the elongate tape.

BACKGROUND

As tape capacity increases with each generation, smaller and smaller track spacing is being demanded along with tighter Track MisRegistration (TMR) requirements and increased track density such that tape capacity can be effectively increased without an accompanying loss in data integrity. One of the factors that impedes the increased track density is the dimensional stability of the tape. Tape Dimensional Stability (TDS) is a measure of the positional stability of the magnetic data tracks relative each other and is a function of the tape properties and environment conditions such as temperature, humidity, tension, and creep. These environment factors can cause the tape to expand or contract laterally, across the width of the tape. Therefore, when a tape is written to in one environment condition and subsequently read from in another environment condition, the position of the data tracks across the tape width can change enough to cause signal degradation and read errors.

SUMMARY OF THE INVENTION

Described are embodiments of an invention for storing write environment conditions of a tape cartridge. A tape drive measures and stores the write environment conditions for a portion of tape as a result of receiving a write command to write data to the same portion of tape. In one embodiment, the write environment conditions are measured and stored to the tape cartridge each time a write command is received such that each portion of tape written has corresponding stored write environment conditions. The write environment conditions include temperature and relative humidity in one embodiment. The stored write environment conditions for each portion of tape written creates a historical log of the environment conditions that the tape was written within. The historical log can provide information to a manufacturer or user regarding the environmental conditions the user operates their tape drive within and provides information to assist with failure analysis.

For example, an embodiment of a computer implemented method of storing write environment conditions of a tape cartridge includes receiving a command to write data to a portion of tape. The method measures the write temperature and the write relative humidity of the tape drive as a result of receiving the write command to write the data to the portion of the tape. The method writes the data to the portion of tape and stores the write temperature and the write relative humidity to the tape cartridge as the write environment conditions for the portion of tape.

In one embodiment, the write temperature and write relative humidity are stored in a cartridge memory within the tape cartridge. In one embodiment, the write temperature and the write relative humidity are stored in a non-user area of the tape corresponding to the portion of the tape that was written to. Further, in one embodiment the write temperature and the write relative humidity are stored in a write environment conditions table. In one embodiment, the method collapses the write environment conditions table.

The method also unmounts the tape cartridge in response to determining that one of the write temperature and the write relative humidity are outside an operable temperature range and operable relative humidity range, respectively.

In another embodiment of a tape drive having a head with a plurality of read and write elements for reading data from a tape of a tape cartridge and writing data to the tape of the tape cartridge and a drive control system for moving the tape across the head, the tape drive is configured to receive a command to write data to a portion of the tape. The tape drive measures a write temperature and a write relative humidity of the tape drive as a result of receiving the write command to write the data to the portion of the tape. The tape drive writes the data to the portion of the tape and stores the write temperature and the write relative humidity to the tape cartridge as write environment conditions for the portion of the tape.

In another embodiment of a computer program product for storing write environment conditions of a tape cartridge, the computer program product includes a computer readable storage medium that has program code embodied therewith, the program code is executable by a processor to receive a command to write data to a portion of the tape. The program code is further executable by the processor to measure a write temperature and a write relative humidity of the tape drive as a result of receiving the write command to write the data to the portion of tape. The program code is further executable by the processor to write the data to the portion of the tape and store the write temperature and the write relative humidity to the tape cartridge as write environment conditions of the portion of tape.

BRIEF DESCRIPTION OF THE DRAWINGS

Embodiments of the present invention are understood by referring to the figures in the attached drawings, as provided below.

FIG. 10A illustrates another logical portion of tape that has been written to in accordance with certain embodiments; and FIG. 10B is another exemplary write environment conditions table in accordance with an embodiment of the invention.

Features, elements, and aspects of the invention that are referenced by the same numerals in different figures represent the same, equivalent, or similar features, elements, or aspects, in accordance with one or more embodiments.

DETAILED DESCRIPTION OF THE PREFERRED EMBODIMENT

Figure 1:
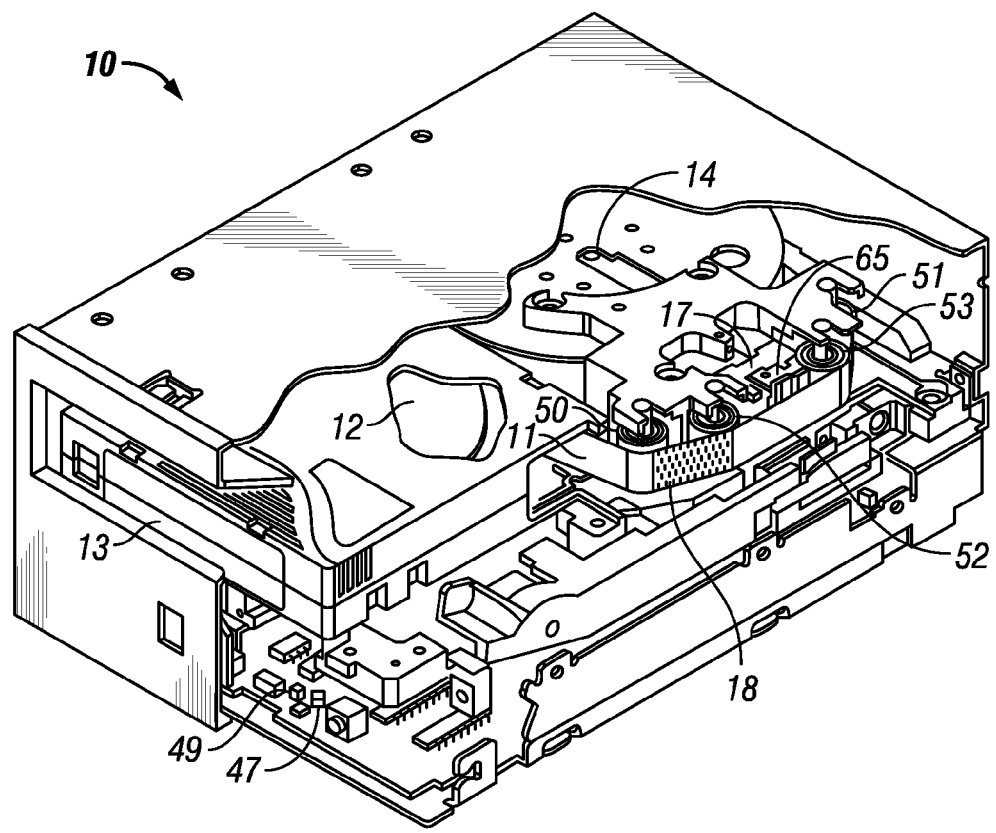
FIG. 1 is a partially cut away view of an exemplary tape drive with a tape cartridge and elongate tape in accordance with an embodiment of the invention.

Magnetic tape includes multiple parallel servo tracks and data tracks. A corresponding magnetic read/write head includes a number of transducing elements to read from, or write to, at least some of the tracks simultaneously. To access other tracks, a head assembly is moved laterally across the width of the tape. The servo tracks on the tape media assist the transducing elements to maintain a proper position on the data tracks.

Multi-track longitudinal recording systems, such as Linear Tape Open (LTO) tape drives, typically write tracks wide and read narrow to account for registration errors between the time the tape was written and then read. Linear Tape Open, LTO, the LTO logo, Ultrium, and the Ultrium logo are trademarks of HP, IBM Corp, and Quantum in the U.S. and other countries. As tracks become narrower to allow for increased tape capacity, even minute changes in the position of a track may lead to track misregistration (TMR) and the inability to properly record to, or read from, a track.

Tape drives generally have a track misregistration budget (TMR budget) which is some percentage of the difference between the write and read width. Data error rates can rise drastically whenever the TMR budget is exceeded.

Tape Dimensional Stability (TDS) is a measure of the positional stability of the magnetic data tracks relative to each other and is a function of the tape properties and environment conditions such as temperature, humidity, tension, and creep. These environment factors can cause the tape to expand or contract laterally, across the width of the tape. Some of these dimensional changes are reversible and some are not. While the read/write head of a tape drive can also experience dimensional changes from these environment conditions, the changes are on orders of magnitude less than the changes that occur in the media. Therefore, when a tape is written to in one environment condition, and subsequently read from in another environment condition, the position of the data tracks across the tape width can change enough to cause signal degradation and read errors. For example, if a tape is written during the time a tape is subjected to a dry environment and is then subsequently read in a high humidity environment, the position of the data tracks across the tape width can expand enough to cause errors when reading the previously written data. Further, when a first data track is written adjacent to, or overlapping, a second data track and the first and second data track are written under different environment conditions, then the position of the data tracks across the tape width can cause signal degradation and read errors. For example, if a first track is written during the time a tape is subjected to a dry environment and the adjacent track is written to in a high humidity environment such that the tape is expanded, then the adjacent track may "squeeze" or overlap the first track enough to cause a read error. Herein, the terms expansion and contraction will refer to expansion and contraction laterally, across the width of the tape.

Tape may be written to many times along the length of tape and with different environment conditions. For example, a first portion of tape may be written to in humid conditions, whereas a second portion may be written to in dry conditions. Further, tape of a tape cartridge may be part of a tape library having multiple drives. Each drive may have different environment conditions, exert a different tension on the tape, or have a slightly different read and/or write element placement.

Therefore, described herein is embodiment of an invention for storing write environment conditions of a tape cartridge. A tape drive measures and stores the write environment conditions for a portion of tape as a result of receiving a write command to write data to the same portion of tape. In one embodiment, the write environment conditions are measured and stored to the tape cartridge each time a write command is received such that each portion of tape written has corresponding stored write environment conditions. The write environment conditions include temperature and relative humidity in one embodiment. The stored write environment conditions for each portion of tape written creates a historical log of the environment conditions that the tape was written within. The historical log can provide information to a manufacturer or user regarding the environmental conditions the user operates their tape drive within and provides information to assist with failure analysis.

In one embodiment, the invention further includes determining if the write environment conditions are outside of an operational range. If it is determined that the write conditions are outside of the operational range, then the tape cartridge is unmounted to prevent damage to the tape drive and the tape. Similarly, in one embodiment, the invention further includes determining if the write environment conditions are outside of a user preferred operational range. If it is determined that the write environment conditions are outside of the user preferred operational range, then the tape drive will alert the user with an error message.

Still further, in one embodiment, the invention includes obtaining and comparing the read temperature to a shingled write temperature stored for data shingled and overlapping the portion of tape and obtaining and comparing the read relative humidity to a shingled write relative humidity stored for the data shingled and overlapping the portion of tape when data of the portion of tape has additional data that is shingled thereon.

It will be obvious, however, to one skilled in the art, that embodiments of the present invention may be practiced without some or all of these specific details. In other instances, well known process operations have not been described in detail to prevent obscuring the embodiments of the present invention described herein.

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

FIG. 1 illustrates an example of a tape drive 10, which may comprise a magnetic tape data storage drive which writes data 18 to, and reads data from, an elongate tape 11 which may comprise magnetic tape data storage media. As is understood by those of skill in the art, magnetic tape data storage drives, also called magnetic tape drives or tape drives, may take any of various forms. The illustrated magnetic tape drive 10 moves the magnetic tape 11 along a tape path in the longitudinal direction of the tape from a supply reel 12 in a magnetic tape data storage cartridge 13 to a take up reel 14. An example of a magnetic tape drive is the Linear Tape-Open® (LTO®) magnetic tape drive. Linear Tape-Open, LTO, the LTO Logo, Ultrium, and the Ultrium logo are trademarks of HP, IBM Corp. and Quantum in the U.S. and other countries. The longitudinal direction is defined as the direction along the length of the magnetic tape 11. The lateral direction is defined as the direction along the width of the magnetic tape 11 and is perpendicular to the longitudinal direction.

The magnetic tape media 11 is moved in the longitudinal direction across a read/write and servo tape head system 65 referred to herein as a magnetic tape head system. The magnetic tape head may be supported and laterally moved by an actuator 17 of a track following servo system. The magnetic tape media is supported by roller tape guides 50, 51, 52, 53, while the magnetic tape media is moved longitudinally.

A typical magnetic tape data storage drive operates in both the forward and reverse directions to read and write data. Thus, the magnetic tape head system 65 may comprise one set of read and write elements for operating in the forward direction and another set for operating in the reverse direction, or alternatively, may have two sets of the read elements on either side of the write elements to allow the same write elements to write in both directions while the two sets of read elements allow a read-after-write in both directions.

Figure 2:
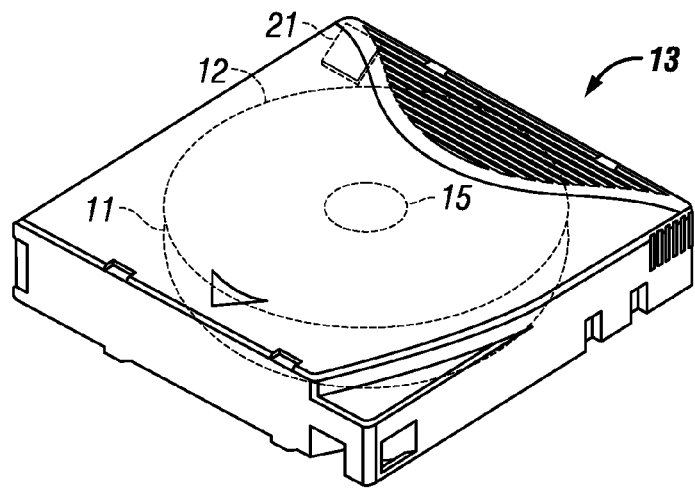
FIG. 2 illustrates a view of a tape cartridge accordance with an embodiment of the invention.

Referring to FIG. 2, a single reel tape cartridge 13 comprising magnetic tape 11, is illustrated wherein the magnetic tape 11 is wound on a hub 15 of supply reel 12. A cartridge memory 21 stores information regarding the data storage cartridge and, for example, comprises a transponder.

Figure 3:
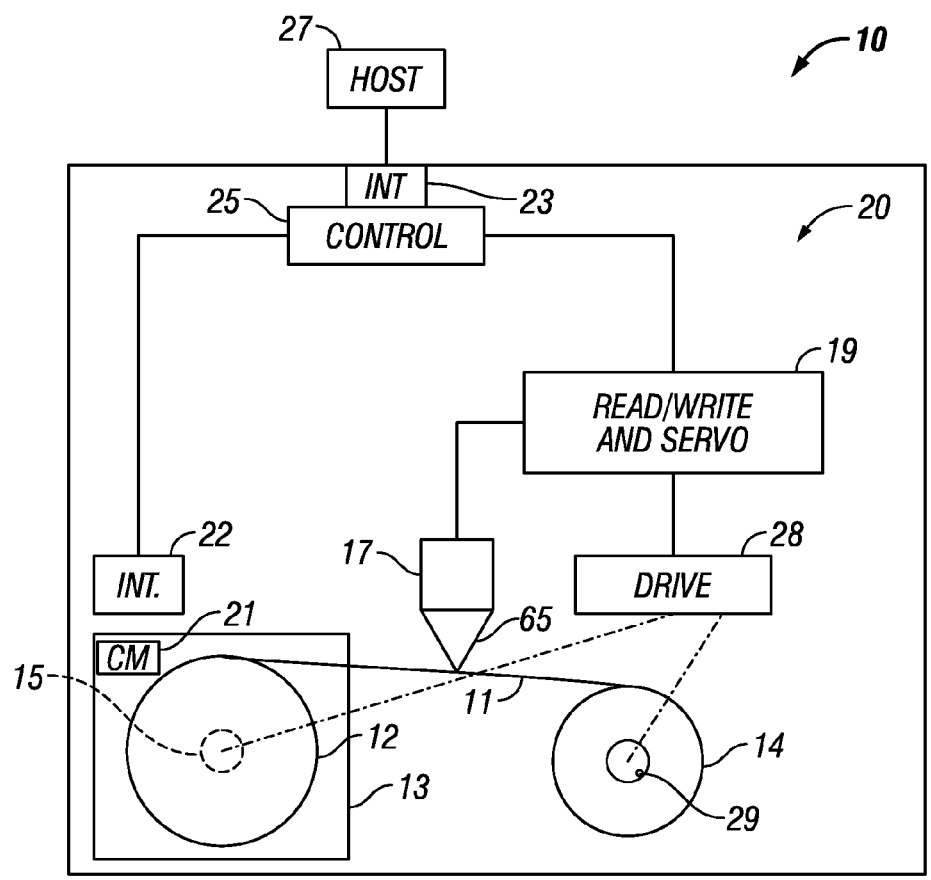
FIG. 3 is a schematic view of the tape drive with a tape cartridge and elongate tape in accordance with an embodiment of the invention.

Referring to FIG. 3, the magnetic tape drive 10 is illustrated wherein the magnetic tape 11 is wound on supply reel 12 in the cartridge 13, and, when loaded in the magnetic tape drive 10, is fed between the cartridge supply reel 12 and a take up reel 14, having hub 29, in the magnetic tape drive 10.

The magnetic tape drive 10 comprises a memory interface 22 for reading information from, and writing information to, the cartridge memory 21 of the magnetic tape cartridge 13. A read/write system is provided for reading and writing information to the magnetic tape, and, for example, may comprise a magnetic tape head system 65 with a servo actuator 17 for moving the head laterally across the magnetic tape 11, a read/write servo system 19, and a drive motor system 28 which moves the magnetic tape 11 between the cartridge supply reel 12 and the take up reel 14 and across the magnetic tape head system 65. A control 25, read/write servo control 19, and drive motor system 28 form a drive control system 20. The read/write and servo system 19 also controls the operation of the drive motor system 28 to move the magnetic tape 11 across the magnetic tape head system 65 at a desired velocity, and, in one example, determines the lateral location of the magnetic tape head system 65 with respect to the magnetic tape 11, and, in another example, determines the longitudinal position of the tape 11 by reading the tape servo tracks, for example, called "LPOS" (Longitudinal POSition), and in another example, the read/write and servo system 19 employs signals from the reel motors to determine the location of the magnetic tape head system 65 with respect to the magnetic tape 11. An interface 23 provides communication with respect to one or more host systems or processors 27, and is configured to receive and to send information externally of the tape drive 10. Alternatively, the tape drive 10 may form part of a subsystem, such as a library, and may also receive commands from the subsystem, also at interface 23.

A control 25 communicates with the host interface 23, with memory interface 22, and communicates with the read/write system, e.g., at read/write and servo system 19. The illustrated embodiments of tape drives are known to those of skill in the art.

Referring to FIG. 1 and FIG. 3, tape drive 10 is also provided with a temperature sensor 47 and a relative humidity sensor 49 for measuring the drive temperature and relative humidity, respectively. In one embodiment, the temperature sensor 47 and the humidity sensor 49 are part of control 25 of the tape drive 10. The temperature sensor 47 and relative humidity sensor 49 provide a measured drive temperature and relative humidity to control 25. In one embodiment, the temperature sensor 47 and relative humidity sensor 49 may comprise solid state temperature and humidity sensors, respectively. In one embodiment the temperature sensor 47 and relative humidity sensor 49 are placed near the front of the drive 10, as shown in FIG. 1. Generally, during a read or write operation by the tape drive 10, ambient air is pulled in and through the drive 10 and across the tape media 11. Accordingly, temperature sensor 47 and the relative humidity sensor 49 placed near the front of the drive 10 provide a relatively accurate measurement of the environmental conditions that the tape experiences when data is written to, or read from, tape 11 (e.g. environmental conditions of the tape or tape path). Alternatively, the temperature sensor 47 and relative humidity sensor 49 may be placed anywhere within the tape drive 10 where temperature and relative humidity measurements would accurately reflect the temperature and relative humidity conditions that the tape media 11 is exposed to. Still further, in another alternative embodiment, the temperature sensor 47 and relative humidity sensor 49 may be placed anywhere within the tape drive 10 where the environmental conditions have a known offset from the tape 11 environmental conditions. For example, the temperature sensor 47 and the relative humidity sensor 49 may be placed away from the tape path where the environmental conditions have a known 5 degree Celsius difference. Accordingly, the temperature of the tape media 11, described further herein as the write or read temperature, can be estimated in Equation 1 as:

$$T_E = T_M + T_A \quad \text{(Equation 1)}$$

where $T_E$ is the estimated temperature (in degrees Celsius, ° C.) that the tape experiences in the tape path;

$T_M$ is the write temperature (° C.) directly measured by temperature sensor 47; and $T_A$ is the known difference in temperature (° C.) between the location of the temperature sensor and the temperature the tape experiences in the tape path.

Further, the relative humidity can then be approximated by the Equation 2 below.

$$H_E = H_M \frac{e(T_M)}{e(T_E)} \quad \text{(Equation 2)}$$

where $H_E$ is the estimated relative humidity value at temperature $T_E$ $H_M$ is the measured relative humidity value at the temperature $T_M$, and e(T) is the saturation vapor pressure (in hPa) at temperature, T, and can be estimated using the Teten's equation, as shown in Equation 3, below:

$$e(T) = 6.1078 \times 10^{\frac{7.5T}{T+237.3}} \quad \text{(Equation 3)}$$

While the temperature sensor 47 and relative humidity sensor 49 are shown as two separate sensors in one area within the tape drive one of ordinary skill in the art would understand that the temperature sensor 47 and relative humidity sensor 49 may be in separate locations within the tape drive 10. Further, in one embodiment, the temperature sensor 47 and relative humidity sensor 49 are integrated into a single sensor measuring temperature and relative humidity.

While not described herein, the invention also could be implemented in other types of removable data storage cartridges and tape drives that are known to those of skill in the art. For example, other contemplated types of removable data storage cartridges and tape drives include, but are not limited to, two reel magnetic tape cartridges and drives and optical tape cartridges and drives.

Figure 4:
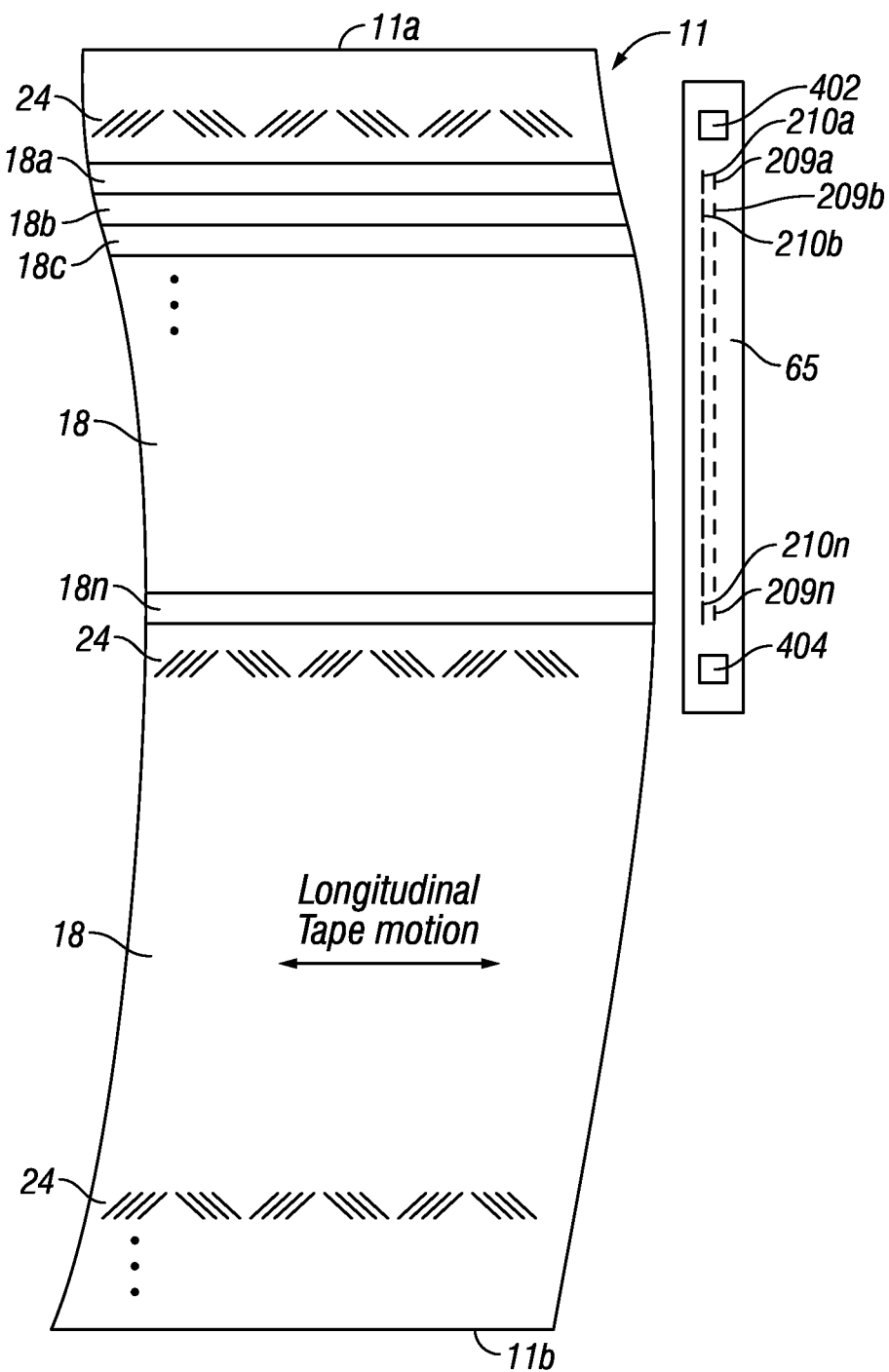
FIG. 4 is a schematic view of a portion of tape and a magnetic tape head in accordance with an embodiment of the invention.

FIG. 4 shows magnetic tape 11 and a magnetic tape head system 65. The magnetic tape 11 is formatted during manufacture with a plurality of servo bands 24 that are parallel to the edges 11a and 11b of the magnetic tape 11. Data 18 is stored on longitudinal data tracks 18a, 18b . . . 18n which are parallel to, and lie between, the servo bands 24. The read/write and servo system 19 of FIG. 3 employs the signals from servo pattern 24 as read by servo elements 402 and 404 of the magnetic tape head system 65 to position read elements 209a, 209b . . . 209n and write elements 210a, 210b . . . 210n of magnetic tape head system 65 laterally with respect to the data tracks 18a, 18b . . . 18n of magnetic tape 11. The multiple read elements 209 and write elements 210 read and/or write data from data tracks of the data bands 18.

In the illustrated embodiments, various depictions of portions of tape are provided. Many of these depictions illustrate one or two data bands for the sake of convenience. However, the skilled artisan would appreciate that the implementation of additional data bands are contemplated. As tape formats become more sophisticated, the use of additional numbers of data bands such as four, eight, sixteen or more data bands are also contemplated herein. Similarly, the skilled artisan would appreciate that while the illustrations depict a magnetic tape head system 65 having 16 read elements 209a, 209b, . . . 209n and 16 write elements 210a, 210b, . . . 210n, that the implementation of any number of read and write elements is contemplated. For example, the magnetic tape head may have 8, 16 or 32 read and write elements.

Figure 5:
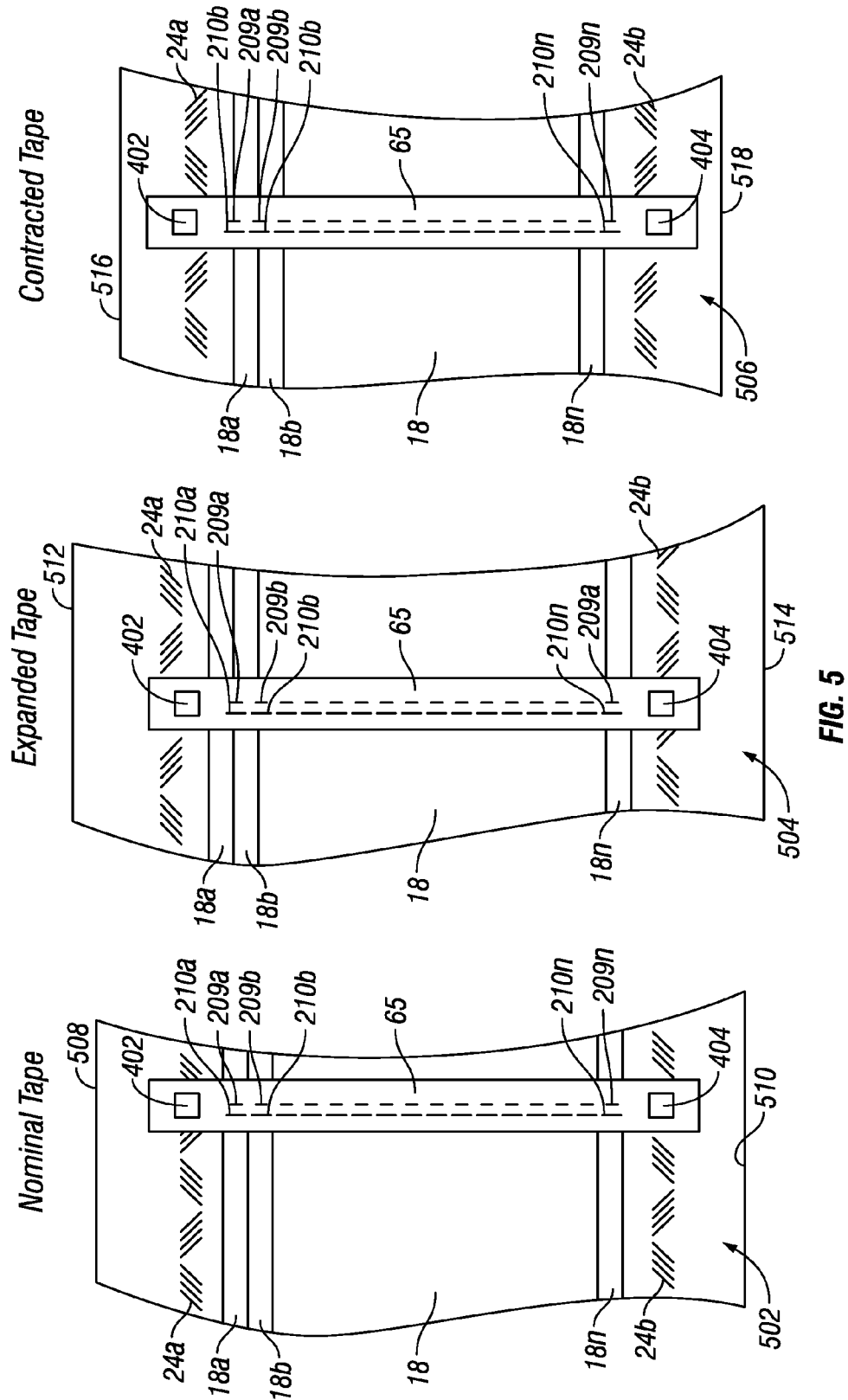
FIG. 5 is a schematic view of portions of tape of nominal, expanded, and contracted dimension in accordance with an embodiment of the invention.

FIG. 5 illustrates an exemplary magnetic tape head system 65 and three portions of tape 502, 504, and 506 for comparison purposes. The first portion of tape is at a nominal lateral tape dimension, and is herein referred to as nominal tape 502. The nominal tape 502 is not expanded or contracted due to environment conditions. The second portion of tape has been expanded by environment conditions, and is herein referred to as expanded tape 504. The third portion of tape has been contracted by environment conditions, and is herein referred to as contracted tape 506. Each portion of tape 502, 504, 506 includes a top servo band 24a and a bottom servo band 24b. In between the tape servo band 24a and the bottom servo band is data 18. In particular, data 18 is written to, or read from data tracks 18a, 18b . . . 18n of magnetic tape.

Referring to nominal tape 502, the top tape edge 508 and bottom tape edge 510 define the nominal tape spacing shown in FIG. 5. The distance between the servo head elements 402 and 404 is manufactured to be the same distance apart as the nominal distance between the same point on two adjacent servo bands (e.g. for example the center of the two servo bands 24a and 24b). When the servo elements 402, 404 are properly positioned at the defined servo band 24 of a nominal tape, the read elements 209a, 209b . . . 209n and write elements 210a, 210b . . . 210n are fully aligned to transfer data with respect to the data track locations 18a, 18b . . . 18n of magnetic tape. For example, as shown for nominal tape 502 in FIG. 5, read element 209a is fully aligned over data track 18a to read data from data track 18a. Read element 209b is fully aligned over data track 18b to read data from data track 18b. Read element 209n is fully aligned over data track 18n to read data from data track 18n. Similarly, write element 210a is fully aligned over data track 18a to write data to data track 18a. Write element 210b is fully aligned over data track 18b to write data to data track 18b. Finally, write element 210n is fully aligned over data track 18n to write data to data track 18n.

Referring to the portion of expanded tape 504 shown in FIG. 5, the top tape edge 512 and bottom tape edge 514 are spaced apart at a greater distance than the top tape edge 508 and bottom tape edge 510 of nominal tape 502. Accordingly, when the servo elements 402, 404 are properly positioned at the defined servo band 24 of an expanded tape 504, the read elements 209a, 209b . . . 209n and write elements 210a, 210b . . . 210n may not be properly positioned to transfer data with respect to the data track locations 18a, 18b . . . 18n of magnetic tape. For example, as shown for expanded tape 504, read element 209a is not fully aligned over data track 18a to read data from data track 18a. Further, read element, 209b is not fully aligned over data track 18b to read data from data track 18b, nor is read element 209n fully aligned over data track 18n to read data from data track 18n. Similarly, write element 210a is not fully aligned over data track 18a to write data to data track 18a, write element 210b is not fully aligned over data track 18b write data to data track 18b, and write element 210n is not fully aligned over data track 18n to write data to data track 18n. Accordingly, tape drive 10 may return a read error when attempting to read expanded tape 504.

Referring to the portion of contracted tape 506 shown in FIG. 5, the top tape edge 516 and bottom tape edge 518 are spaced apart at a smaller distance than the top tape edge 508 and bottom tape edge 510 of nominal tape 502. Accordingly, when the servo elements 402, 404 are properly positioned at the defined servo band 24 of an contracted tape 506, the read elements 209a, 209b . . . 209n and write elements 210a, 210b . . . 210n may not be properly positioned to transfer data with respect to the data track locations 18a, 18b . . . 18n of magnetic tape. For example, as shown for contracted tape 506, read element 209a is not fully aligned over data track 18a to read data from data track 18a. Further, read element, 209b is not fully aligned over data track 18b to read data from data track 18b, nor is read element 209n fully aligned over data track 18n to read data from data track 18n. Similarly, write element 210a is not fully aligned over data track 18a to write data to data track 18a, write element 210b is not fully aligned over data track 18b write data to data track 18b, and write element 210n is not fully aligned over data track 18n to write data to data track 18n. Accordingly, tape drive 10 may return a read error when attempting to read contracted tape 506.

Figure 6:
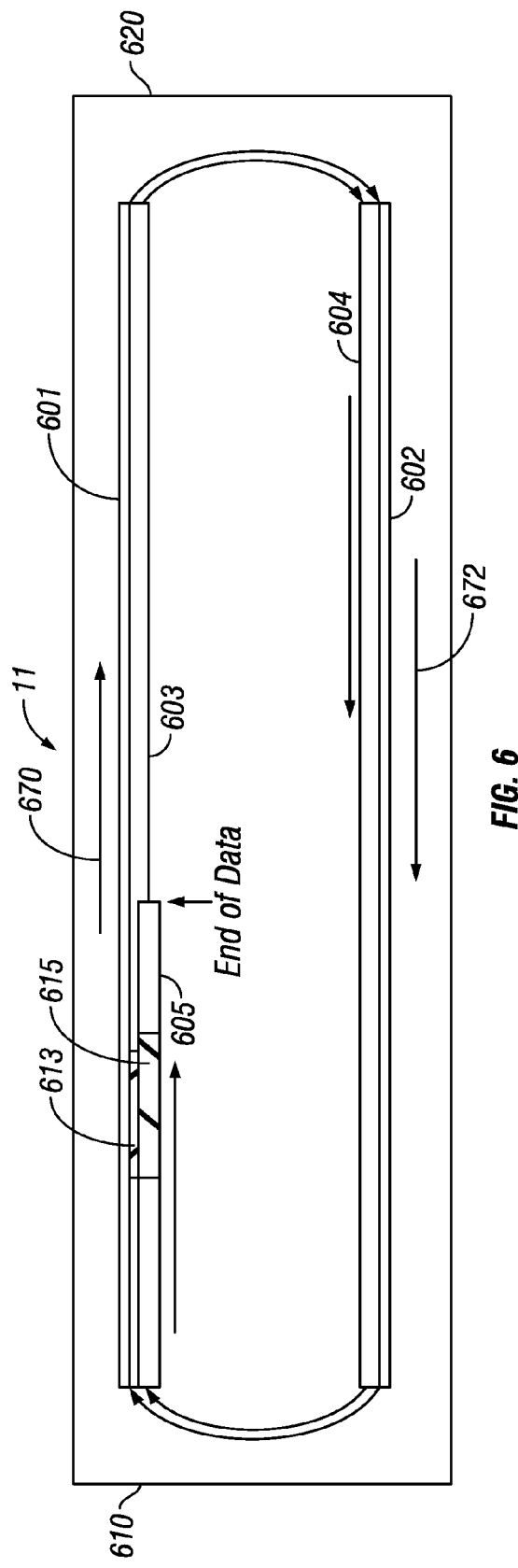
FIG. 6 is a schematic view of a portion of tape showing data wraps that are shingled in accordance with an embodiment of the invention.

FIG. 6 illustrates a magnetic tape 11 with several parallel wraps or groups of parallel tracks that are shingled. In one embodiment, shingling may be used to increase the number of tracks that can be recorded without reducing the size of the tape write elements. In a shingled write, the write track may partially overlap a portion of the previously written track. In the illustrated example of FIG. 6, the magnetic tape 11 is moved longitudinally in a first direction 670 from the leading end of the tape 610 while the head magnetic tape head system 65 reads and/or writes data with respect to one linear path, and is reversed at the other end of the tape 620 (hereinafter referred to as the end of tape) to be moved in the opposite direction 672 and the magnetic tape head system 65 is shifted to another linear tape path of the wrap. These paths are termed "serpentine" paths.

For example, referring to FIG. 6, the magnetic tape 11 is moved longitudinally in a first direction 670 from the leading edge of tape 610 while the magnetic tape head system 65 writes data on track 601. The magnetic tape head system 65 is reversed at the end of tape 620 and is shifted to another linear tape path and the magnetic tape 11 is moved in the opposite direction 672 while the magnetic tape head system 65 writes data track 602. The process repeats with the magnetic tape head system 65 reversing at the leading edge of tape 610 and shifting to another linear tape path. The magnetic tape is moved in the first direction 670 while the magnetic tape head system 65 writes data on data track 603 on a portion of tape 613 of data track 603. Data track 603 is parallel and overlaps data track 601. The magnetic tape head system 65 is reversed at the end of tape 620 and is shifted to another linear tape path and the magnetic tape 11 is moved in the opposite direction 672 while the magnetic tape head system 65 writes data track 604. Data track 604 is parallel and overlaps data track 602. Finally, as shown in FIG. 6, the magnetic tape head system 65 reverses at the leading edge of the tape 610 and shifts to another linear tape path. The magnetic tape is moved in the first direction 670 and the magnetic tape head system 65 writes data on data track 605. In particular, the magnetic tape head system 65 writes data on a portion of tape 615 of data track 605. Data track 605 is parallel and overlaps data track 603. Data on portion of tape 613 has additional data of portion of tape 615 shingled thereon. The shingled data of portion of tape 615 overlaps data of portion of tape 613.

Environment conditions such as temperature and relative humidity can have a significant impact on reading and writing data that has been written as shingled data tracks. For example, consider an example in which data track 603 is written in average relative humidity conditions such that the magnetic tape 11 has the a nominal lateral tape dimension and resembles nominal tape 502. Subsequently, data track 605 is written in humid conditions such that the magnetic tape 11 is expanded causing the data tracks across the tape width to have expanded and resemble expanded tape 504. Accordingly, data track 605 is written wider than nominal spacing and may overlap a larger portion of data track 603 than normal. If the magnetic tape head system 65 subsequently attempts to read data on data track 603 in average relative humidity conditions, then data track 605 may overlap data track 603 enough to cause a read error when reading previously written data. In particular, read element 209 of the magnetic tape head system 65 may not be properly aligned with data track 603 due to data track 605 overlapping and squeezing data track 603.

In the illustration of FIG. 6, only one path is shown for each wrap, however, one of ordinary skill in the art would understand that on physical tape, a number of read and write elements are arranged to trace parallel paths within the linear path. The individual write elements shingle each of the parallel paths creating the linear paths.

Figure 7:
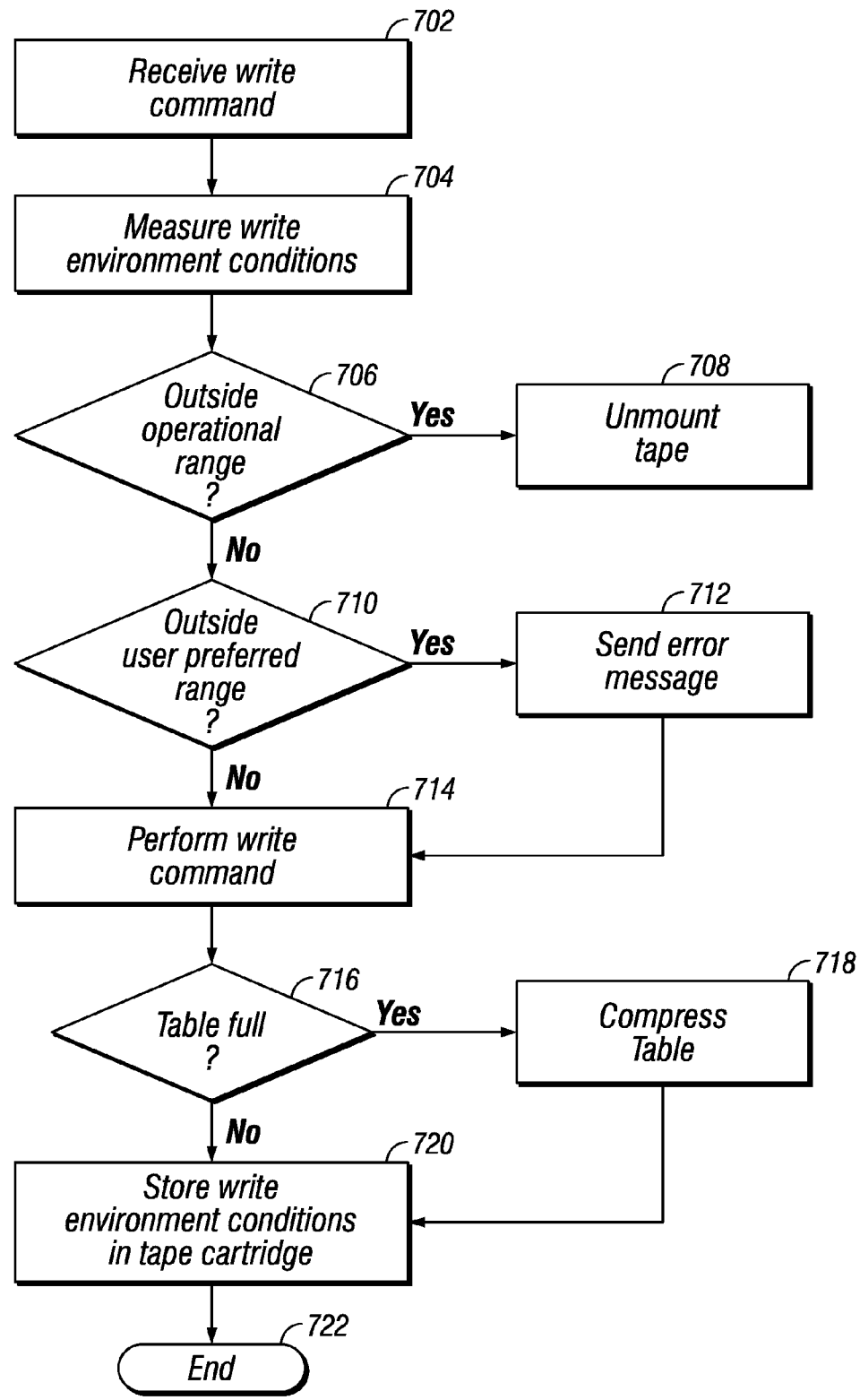
FIG. 7 is a flow chart of an exemplary method of storing write environment conditions of tape in accordance with an embodiment of the invention.
Figure 8:
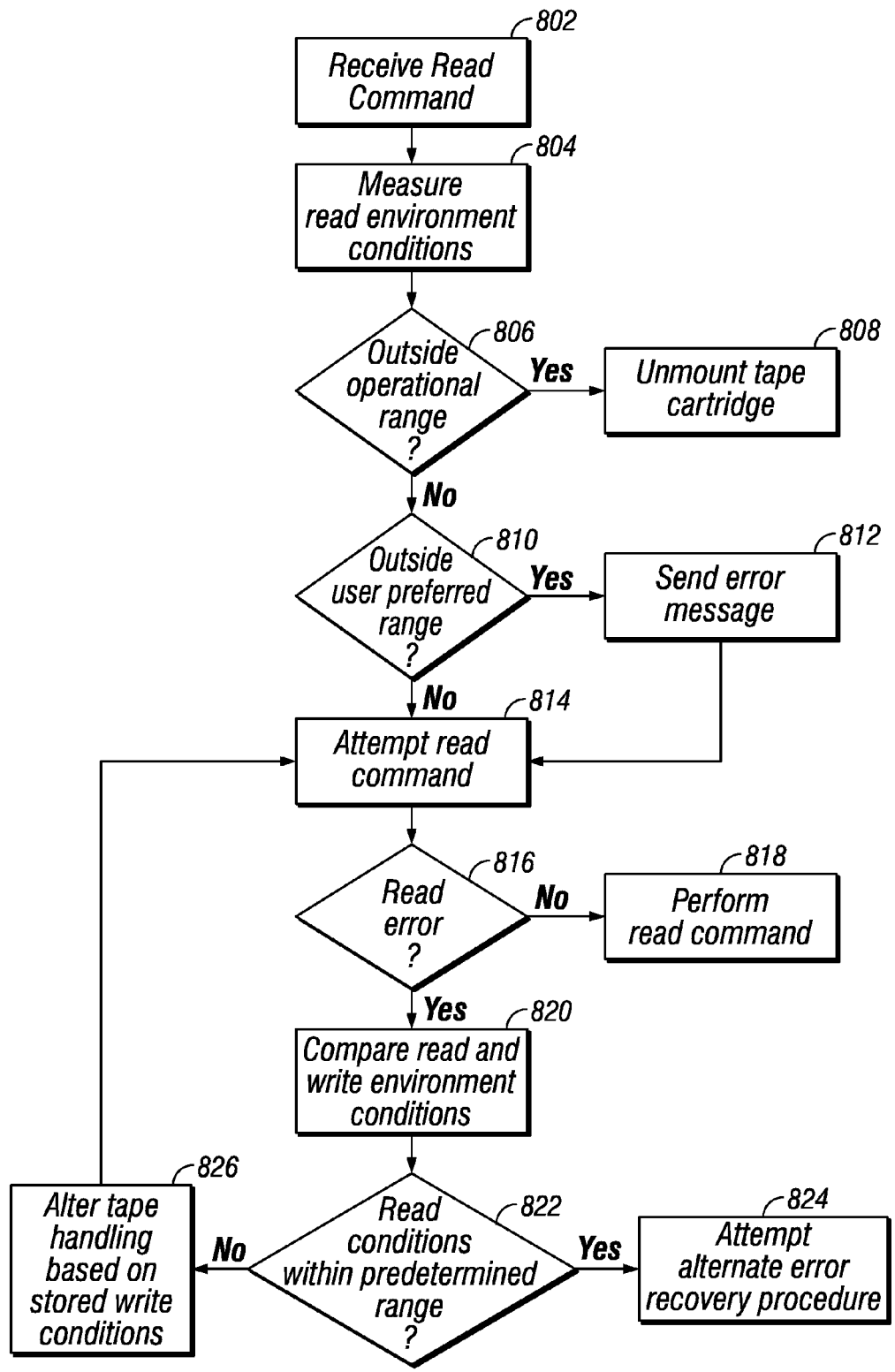
FIG. 8 is a flow chart of an exemplary method of using stored write environment conditions of a tape in read error recovery in accordance with an embodiment of the invention.

Referring to FIG. 7 and FIG. 8, which illustrate embodiments of storing write environment conditions of a tape cartridge and utilizing stored write environment conditions of a tape cartridge for use in read error recovery, respectively.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 7 illustrates an embodiment of storing write environment conditions of a tape cartridge. In one embodiment, the following algorithm is part of the tape drive's microcode. Alternatively, in another embodiment, the algorithm is part of the tape drive's hardware. The process begins in step 702. In step 702, the magnetic tape drive 10 receives a write command to write data to a portion of tape 11.

In step 704, the magnetic tape drive 10 measures the write environment conditions of the tape drive 10 as a result of receiving a write command. One of ordinary skill in the art would understand that in most cases the environment conditions of the tape drive 10 are the same environment conditions that the tape media 11 would experience once mounted within the tape drive 10. As described above, the temperature sensor 47 and relative humidity sensor 49 may be placed anywhere within the tape drive 10 where temperature and relative humidity measurements would accurately reflect the temperature and the relative humidity conditions that the tape media 11 is exposed to. Accordingly, the temperature sensor 47 and relative humidity sensor 49 of tape drive 10 directly measure the write environment conditions of the tape media 11. However, in an embodiment in which the temperature sensors 47 and the relative humidity sensor 49 are placed within the tape drive 10 where the environmental conditions have a known offset from the tape media 11, the temperature sensor 47 and the relative humidity sensor 49 of tape drive 10 measure the environment conditions and determine the write environment conditions using Equation 1, Equation 2 and Equation 3 as described above. For ease of description, whether the environment conditions of the tape 11 are directly measured by the temperature sensor 47 and the relative humidity sensor 49, or determined based on the measurement of the temperature sensor 47 and humidity sensor 49 and a known offset of temperature, the measurements will be referred to herein as write environment conditions. Further, the tape drive 10 environment conditions directly measured, or estimated based on measurements taken as a result of the tape drive 10 receiving a write command in step 704 will be referred to herein as the write environment conditions (e.g. write temperature and write relative humidity).

Accordingly, the tape drive 10 effectively measures the write environment conditions of the tape 11 when writing data to the portion of tape 11 by measuring the environment conditions of the tape drive 10 upon receiving a write command in step 704. In one embodiment, the write environment conditions the magnetic tape drive 10 measures as a result of receiving a read command includes at least one of the write temperature and write relative humidity of the tape drive 10 using a temperature sensor 47 and humidity sensor 49, respectively.

In one embodiment, the write environment conditions are measured upon mounting the tape cartridge 13 into the tape drive 10. In another embodiment, the write environment conditions may be measured just prior to unmounting the tape cartridge 13 from the tape drive 10. In one embodiment, the write environment conditions can be measured throughout the time that the tape cartridge 13 is mounted within the tape drive 10. For example, the write environment conditions, such as temperature and relative humidity, may be measured at regular intervals (e.g. every 30 seconds, every minute, or other unit of time) while the tape cartridge 13 is mounted within the tape drive 10. In this embodiment, the extremes such as maximum write temperature, $T_{max}$, minimum write temperature, $T_{min}$, maximum write relative humidity, $RH_{max}$, and minimum write relative humidity, $RH_{min}$, may be stored. Further, the write environment conditions can be measured throughout the time that the tape cartridge 13 is mounted within the tape drive 10 and the average temperature, $T_{avg}$ and the average relative humidity $RH_{avg}$ may be stored.

In step 706 the tape drive determines if the write environment conditions are outside the operable range for writing data to the portion of tape. In one embodiment, the tape drive determines if the write temperature is outside an operable temperature range and if the write relative humidity is outside an operable relative humidity range. In one embodiment, the operational temperature range is between 16° C. and 32° C. Further, in one embodiment the operational relative humidity range is between 20% and 80% relative humidity. In one embodiment, the operational temperature range and the operable relative humidity range are stored in code or microcode of control 25. If the tape drive 10 determines in step 706 that either the write temperature or the write relative humidity is outside of the operable temperature range or operable relative humidity range, respectively, then in step 708 the tape drive 10 unmounts the tape cartridge 13. As discussed above, in extreme conditions, the temperature or relative humidity can be so high that the tape 11 becomes weaker and less rigid. When this happens, damage to the tape drive 10 and the tape media 11 can occur if the tape 11 remains within use in the tape drive 10. Accordingly, in one embodiment, as a result of measuring write environment conditions, such as a write temperature or a write relative humidity, and determining that write environment conditions are not within the operable conditions, such as an operable temperature range or an operable relative humidity range, respectively, it is beneficial to unmount the tape cartridge 13 to avoid any damage to the tape cartridge 13 or the tape drive 10 in which it is mounted.

However, if in step 706 the tape drive 10 determines that the write environment conditions are not outside the operational ranges then the process proceeds to step 710. For example, if the tape drive 10 determines that the write temperature is not outside the operational temperature range and the write relative humidity is not outside the operable relative humidity range, then the process proceeds to step 710. In step 710, the tape drive 10 determines if the write environment conditions are outside the user preferred operational range. For example, the tape drive 10 determines if the write temperature is outside the user preferred temperature range and if the relative humidity is outside the user preferred relative humidity range. The user preferred temperature range and the user preferred relative humidity range are the temperature range and relative humidity range, respectively, that the user would like operate within to achieve the best read and write performance. The user preferred temperature range and the user preferred relative humidity range are narrower ranges than the operable temperature range and the operable relative humidity ranges, respectively. In one embodiment, the user preferred temperature range and the user preferred relative humidity range are stored in code or microcode of control 25. In one embodiment, the user could provide the user preferred temperature range and the user preferred relative humidity range through host interface 23 to be stored in control 25. For example, in one embodiment the user preferred temperature range is between 20 and 30° C. Further, in one embodiment the user preferred relative humidity range is between 30% and 50% relative humidity. It should be understood by one of ordinary skill in the art the user preferred temperature range and the user preferred relative humidity ranges can be chosen by each user, and are not limited by the example ranges given above.

If the tape drive 10 determines in step 710 that any of the write environment conditions are outside the user preferred range, then in step 712 the tape drive 10 sends an error message. For example, if the tape drive 10 determines either the write temperature or the write relative humidity is outside of the user preferred temperature range or relative humidity range, respectively, then in step 712 the tape drive 10 returns an error message or status. The tape drive 10 may return an error message or status by methods known in the art. One of ordinary skill in the art would understand, the tape drive may be part of a tape library (not shown), and in one embodiment, the error message may be displayed on a graphical user interface (GUI). Further, in one embodiment, the GUI may provide information about the error such as the write temperature or write relative humidity and the user preferred range of temperature and relative humidity.

Figure 9A:
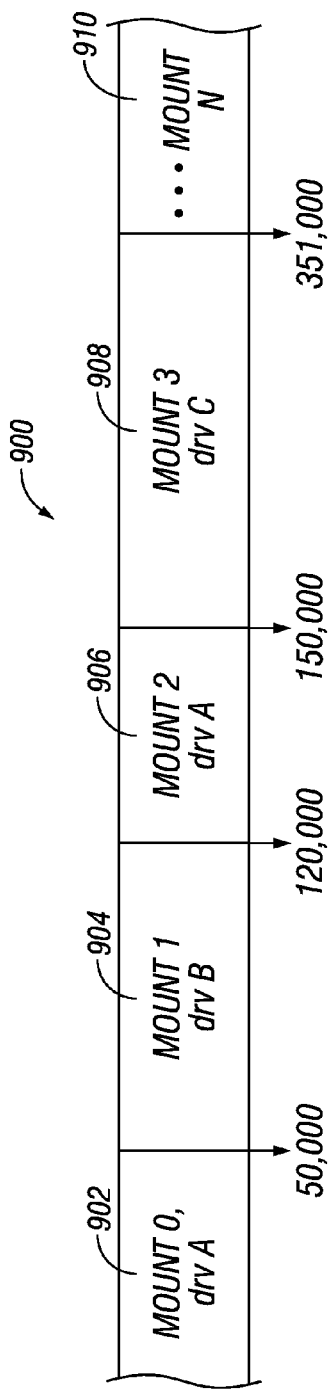
FIG. 9A illustrates a logical portion of tape that has been written to in accordance with certain embodiments.
Figure 9B:
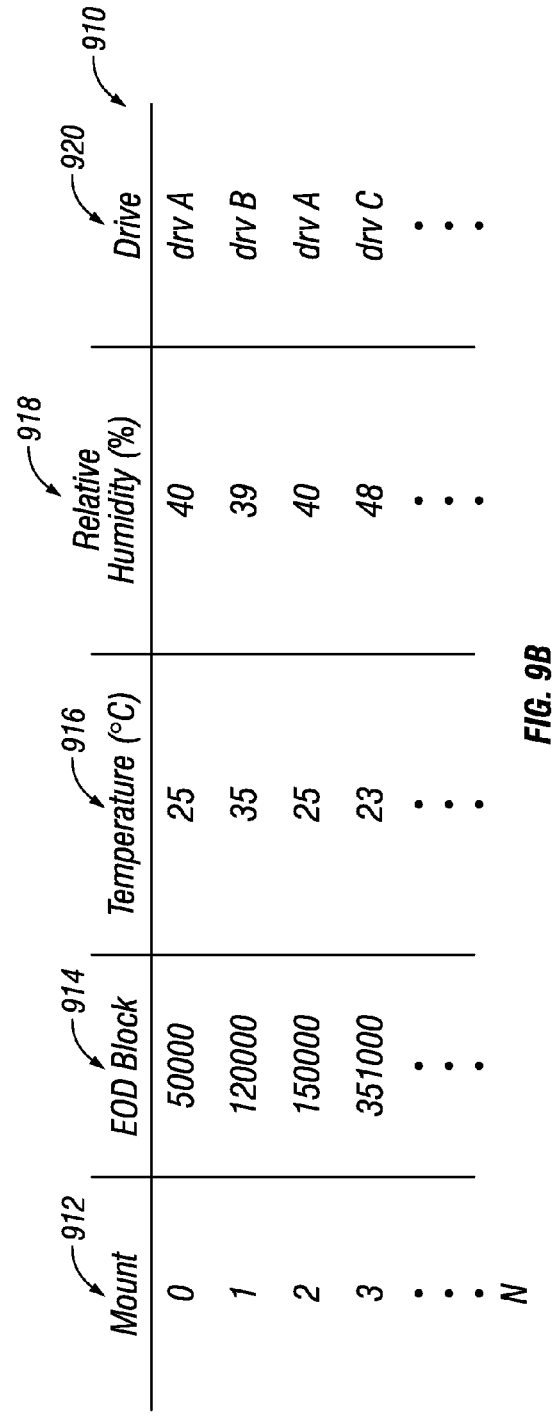
FIG. 9B is an exemplary write environment conditions table in accordance with an embodiment of the invention.

If, however, in step 710 the tape drive 10 determines that none of the write environment conditions are outside the user preferred range, then the process proceeds to step 714. For example, if the write temperature is not outside the user preferred temperature range and the write relative humidity is not outside the user preferred relative humidity range, then the process proceeds to step 714. In step 714 the tape drive 10 performs the write command that was received in step 702. In one embodiment, the process proceeds to optional step 716. In another embodiment, the process skips optional step 716 and proceeds directly to step 720. In the embodiment in which optional step 716 is performed, the tape drive 716 determines if the write environment conditions table is full. In one embodiment, a write environment conditions table 910, shown in FIG. 9B, is used to store the write environment conditions for each portion of tape 11 being written to. In an alternative embodiment, a write conditions table 1010, as shown if FIG. 10 is used to store environmental conditions for each portion of tape 11 being written to. As will be understood by the following description, write conditions table 910 and 1010 are only examples of write conditions tables that may be used to store the tape media's 11 environment conditions under with the user operates their tape drive. For example, there may be additional entries or entries within the write conditions table 910, 1010 that are omitted so long as the write environment conditions, such as temperature and relative humidity, are stored to the tape cartridge for the portion of tape being written to. It should be understood by one of ordinary skill in the art that any method of storing information that provides the tape drive 19 with all of the necessary information to determine the portion of tape that particular data was written to and the environment conditions, such as temperature and relative humidity, which the tape was subjected to when the data was written, is contemplated in this invention.

In one embodiment, the write environment conditions table 910, 1010 has a finite amount of data that can be stored. For example, in one embodiment, the write environment conditions table may store 16 kilobytes of data. Accordingly, as the tape drive 10 writes data to more and more portions of tape the write environment conditions table 910, 1010 can become full such that no more data can be stored. If the tape drive 10 determines in step 716 that the write environment conditions table 910 is not full, then in step 720 the tape drive 10 stores the write environment conditions measured in step 704 in the tape cartridge. For example, the tape drive 10 stores the write temperature and write relative humidity measured in step 704 in the tape cartridge 13. The temperature and relative humidity measured, or estimated by the measurement in step 704 is herein referred to as the write temperature and the write relative humidity, respectively. In one embodiment, the tape drive 10 stores the write temperature and write relative humidity to the cartridge memory 21 within the tape cartridge 13. In this embodiment, a memory interface 22 for reading information from, and writing information to, the cartridge memory 21 may be utilized. In one embodiment, the memory interface is a radio frequency identification tag (RFID tag) to read information from, and write information to cartridge memory 21, as known by those skilled in the art. However, one of ordinary skill in the art would understand that the measured temperature and relative humidity could be stored in another memory device or on the tape media 11 itself. In another embodiment, the tape drive 10 stores the write temperature and the write relative humidity to a non-user area of the tape corresponding to the portion of tape that the data was written to. A non-user area of tape is defined as an area of the tape where user data is stored. In one embodiment the non-user area of tape is at the beginning of tape. In another embodiment, the non-user area is at the end of tape. In one example, the write temperature and the write relative humidity are stored in the field replaceable unit identity (FRU ID or FID). The process ends at step 722.

In one embodiment, the temperature and relative humidity are stored in the form of write environment conditions table 910 shown in FIG. 9B or 1010 shown in FIG. 10B. As understood by one skilled in the art, a tape cartridge 13 may be stored in a tape library (not shown) having a plurality of tape drives that write to tape 11. For example, FIG. 9A shows logical tape 900 which has been written to by multiple tape drives (tape drives drvA, drvB, and drvC). As shown in FIG. 9A, tape drive, drvA, in mount 0 of tape cartridge 13 mounts tape cartridge 13 and writes data to a portion of the tape 902 which ends at end of data (EOD) block 50,000. As illustrated in FIGS. 9A and 9B, tape drive, drvA, measures a temperature of 25° C. and a relative humidity of 40% in step 704, and stores the measured environment conditions in the write environment conditions table 910. In particular, tape drive, drvA, stores the mount number, 0, in the mount column 912, the EOD block, 50,000 in the EOD block column 914, the measured temperature, 25° C. in the temperature column 916, the relative humidity, 40%, in the relative humidity column 918 and the drive, drvA, in the drive column 920 in the write environment conditions table 910.

Further, tape drive, drvB, in mount 1, mounts tape cartridge 13 and writes data to a portion of the tape 904 which ends at end of data (EOD) block 120,000. Tape drive, drvB, measures a temperature of 35° C. and a relative humidity of 39% in step 704 and stores the measured environment conditions in the write environment conditions table 910. In particular, tape drive, drvB, stores the mount number, 1, in the mount column 912, the EOD block, 120,000 in the EOD block column 914, the measured temperature, 35° C. in the temperature column 916, the relative humidity, 39%, in the relative humidity column 918 and the drive, drvB, in the drive column 920 in the write environment conditions table 910.

Similarly, drvA, in mount 2, mounts tape cartridge 13 and writes data to a portion of the tape 906 which ends at end of data (EOD) block 150,000. Tape drive, drvA, measured a temperature of 25° C. and a relative humidity of 40% in step 704, and stores the measured environment conditions in the write environment conditions table 910. In particular, tape drive, drvA, stores the mount number, 2, in the mount column 912, the EOD block, 150,000 in the EOD block column 914, the measured temperature, 25° C. in the temperature column 916, the relative humidity, 40%, in the relative humidity column 918 and the drive, drvA, in the drive column in the write environment conditions table 910.

Finally, drvC, in mount 3, mounts tape cartridge 13 and writes data to a portion of the tape 908 which ends at end of data (EOD) block 351,000. Tape drive, drvC, measured a temperature of 23° C. and a relative humidity of 48% in step 704, and stores the measured environment conditions in the write environment conditions table 910. In particular, tape drive, drvC, stores the mount number, 3, in the mount column 912, the EOD block, 351,000 in the EOD block column 914, the measured temperature, 23° C. in the temperature column 916, the relative humidity, 48%, in the relative humidity column 918 and the drive, drvC, in the drive column in the write environment conditions table 910.

As understood by those of ordinary skill in the art, the tape drive currently stores information that defines where data is written on tape, such as a tape directory. The tape directory contains information about the location of data including the wrap, the number of data blocks written, and the cumulative data block. In one embodiment, the tape directory is stored in the cartridge memory 21, but could be stored on the tape itself 11. The tape directory, in combination with the stored write environment conditions table, provides the tape drive 19 with all of the necessary information to determine the portion of tape that particular data was written to and the environment conditions, such as temperature and relative humidity, which the tape was subjected to when the data was written. Further, the tape directory, in combination with the stored write environment conditions table, provides the tape drive 19 with all of the necessary information to determine the write environment conditions stored for any data shingled and overlapping the portion of tape.

As discussed above, write conditions table 910 may have additional entries, or omit entries, so long as all of the necessary information is stored to determine the portion of tape that particular data was written to, and the environment conditions, such as temperature and relative humidity, which the tape was subjected to when the data was written. For example, in write conditions table 910, the drive identification shown in column 920 of the write conditions table 910 could be omitted because the drive identification may determined through the thread count of the tape along with other information commonly stored in the tape directory. In another embodiment, write conditions table 910 could have additional columns to record the maximum write temperature, $T_{max}$, and minimum write temperature, $T_{min}$, which the portion the tape being written to experiences. Further, in another embodiment, write conditions table 910 could have additional columns to record the maximum write relative humidity, $RH_{max}$, and minimum write relative humidity, $RH_{min}$, which the portion the tape being written to experiences. Still in a further embodiment, the write temperature and write relative humidity stored in columns 916 and 918 in write conditions table 910 may be average write temperature, $T_{avg}$ and the average write relative humidity $RH_{avg}$, respectively, which the portion of tape being written to experiences.

In another embodiment, the write temperature and write relative humidity are stored in the form of write environment conditions table 1010 shown in FIG. 10B. As understood by one skilled in the art, a tape cartridge 13 may be stored in a tape library (not shown) having a plurality of tape drives that write to tape 11. As shown in FIG. 10A, tape drive, drvA, in thread count 0 of tape cartridge 13 mounts tape cartridge 13 and writes 5 data sets to a portion of the tape 902 on tape write pass 10,001, which ends at cumulative data set 5. As illustrated in FIGS. 10A and 10B, tape drive, drvA, measures a maximum write temperature, $T_{max}$, of 26° C. and minimum write temperature, $T_{min}$, of 25° C. In addition, tape drive, drvA, measures a maximum write relative humidity, $RH_{max}$, of 40% and minimum write relative humidity, $RH_{min}$, of 40%. In particular, tape drive, drvA, stores the thread count, 0, in the thread count column 1012, the number data sets written, 5, in the data sets written column 1013, the tape write pass, 10,001, in the tape write pass column 1014, the maximum write temperature, $T_{max}$, of 26° C., in the maximum write temperature, $T_{max}$, column 1016, the minimum write temperature, $T_{min}$, of 25° C., in the minimum write temperature, $T_{min}$, column 1017, the maximum write relative humidity, $RH_{max}$, of 40% in the maximum write relative humidity, $RH_{max}$, column 1018, and the minimum write relative humidity, $RH_{min}$, of 40% minimum write relative humidity, $RH_{min}$, column 1019.

Further, tape drive, drvb, in thread count 1 of tape cartridge 13 mounts tape cartridge 13 and writes 26 data sets to a portion of the tape 904 on tape write pass 10,002, which ends at cumulative data set 31. As illustrated in FIGS. 10A and 10B, tape drive, drvB, measures a maximum write temperature, $T_{max}$, of 35° C. and minimum write temperature, $T_{min}$, of 35° C. In addition, tape drive, drvA, measures a maximum write relative humidity, $RH_{max}$, of 40% and minimum write relative humidity, $RH_{min}$, of 39%. In particular, tape drive, drvA, stores the thread count, 1, in the thread count column 1012, the number data sets written, 26, in the data sets written column 1013, the tape write pass, 10,002, in the tape write pass column 1014, the maximum write temperature, $T_{max}$, of 35° C., in the maximum write temperature, $T_{max}$, column 1016, the minimum write temperature, $T_{min}$, of 35° C., in the minimum write temperature, $T_{min}$, column 1017, the maximum write relative humidity, $RH_{max}$, of 40% in the maximum write relative humidity, $RH_{max}$, column 1018, and the minimum write relative humidity, $RH_{min}$, of 39% minimum write relative humidity, $RH_{min}$, column 1019.

Similarly, drvA, tape drive, drvA, in thread count 2 of tape cartridge 13 mounts tape cartridge 13 and writes 2 data sets to a portion of the tape 906 on tape write pass 10,005 which ends at cumulative data set 33. As illustrated in FIGS. 10A and 10B, tape drive, drvA, measures a maximum write temperature, $T_{max}$, of 25° C. and minimum write temperature, $T_{min}$, of 25° C. In addition, tape drive, drvA, measures a maximum write relative humidity, $RH_{max}$, of 48% and minimum write relative humidity, $RH_{min}$, of 40%. In particular, tape drive, drvA, stores the thread count, 2, in the thread count column 1012, the number data sets written, 2, in the data sets written column 1013, the tape write pass, 10,005, in the tape write pass column 1014, the maximum write temperature, $T_{max}$, of 25° C., in the maximum write temperature, $T_{max}$, column 1016, the minimum write temperature, $T_{min}$, of 25° C., in the minimum write temperature, $T_{min}$, column 1017, the maximum write relative humidity, $RH_{max}$, of 48% in the maximum write relative humidity, $RH_{max}$, column 1018, and the minimum write relative humidity, $RH_{min}$, of 40% minimum write relative humidity, $RH_{min}$, column 1019.

Returning to FIG. 7, if the tape drive 10 determines in step 716 that the write environment conditions table 910, 1010 is full then the tape drive 718 compresses the write environment conditions table 910, 1010. In one embodiment the tape drive 10 compresses the write environment conditions table 910, 1010 by removing the oldest entries such that only the most recent write conditions to the tape 11 are stored. In another embodiment, the tape drive 10 compresses the write environment conditions table by removing the entries that are redundant. For example, a tape drive 10 may operate at the same environment conditions for a period of time. Accordingly, the tape drive 10 will write to the tape 11 under the same general temperature and relative humidity conditions for many mounts. In this circumstance, the tape drive 10 may compress entries on the table to remove the entries that have similar write conditions. In one embodiment the user may determine that the write environment conditions table may be compressed if the write conditions are within a predetermined amount or percentage of each other. Therefore, a user may set the predetermined percentage of 5% such that if two sets write environment conditions are within 5% of each other they may be compressed by removing the redundant entry. For example, if the tape drive measures a first write temperature of 25° C. and a first write relative humidity of 40% and a subsequently measures at a second write temperature of 27° C. and a second relative humidity of 40%, then the tape drive 10 compresses the write environment conditions table 910 to remove the oldest entry of 25° C. and 40%. It should be understood by one of ordinary skill in the art that the user may determine any predetermined percentage or method to compress the write environment conditions table.

In one embodiment, the environment conditions table 910, 1010 is written to when data is written to the tape media 11 or when data is appended. In one embodiment, the tape drive 10 clears write environment conditions table 910, 1010 when the tape drive 10 begins writing data from the beginning of tape. The write environment conditions table 910, 1010 can be cleared by deleting or overwriting the table, or by any means that removes the information stored in the write environment conditions table 910, 1010. One of ordinary skill in the art would understand that in many embodiments the beginning of tape is reserved for storing non-user information including format information for the tape. If the tape drive 10 begin writing data from the beginning of the tape, and thus over previous format information, the tape is treated as a new tape and the write environment conditions table 910, 1010 can be deleted or overwritten, or otherwise cleared.

In step 720 the tape drive 10 stores the write environment conditions measured in step 704 in the tape cartridge as discussed above. For example, the tape drive 10 stores the write temperature and write relative humidity measured in step 704 in the tape cartridge 13. The process of FIG. 7 ends at step 722.

The steps illustrated in FIG. 7 can be repeated for each write command received in step 702 such that the write environment conditions are stored for all data stored on the tape 11. Repeating the steps illustrated in FIG. 7 creates a historical perspective of the tape's environment conditions which may be used by a user or manufacturer to provide information about the environment conditions under with the user operates their tape drive. For example, a user may write data to tape with extreme write environment conditions that are outside of the manufacturer's recommendations. Further, as described herein with respect to FIG. 8, the stored write environment conditions can be used to determine an error recovery procedure.

FIG. 8 illustrates an embodiment of utilizing stored write environment conditions of a tape cartridge for use in read error recovery. In one embodiment, the following algorithm is part of the tape drive's microcode. Alternatively, in another embodiment, the algorithm is part of the tape drive's hardware. The process begins in step 802. In step 802, the magnetic tape drive 10 receives a read command to read data from a portion of tape 11. It is important to note that throughout the following description that the portion of tape 11 containing the data to be read as a result of the command of step 802 will be herein referred to as the portion of tape to be read.

In step 804 the magnetic tape drive 10 measures the read environment conditions of the tape drive 10 as a result of the read command received in step 802. One of ordinary skill in the art would understand that in most cases the environment conditions of the tape drive 10 are the same environment conditions that the tape media 11 would experience once mounted within the tape drive 10. As described above, the temperature sensor 47 and relative humidity sensor 49 may be placed anywhere within the tape drive 10 where the temperature and relative humidity measurements would accurately reflect the temperature and the relative humidity conditions that the tape media 11 is exposed to. Accordingly, the temperature sensor 47 and the relative humidity sensor 49 of tape drive 10 directly measure the read environment conditions of the tape media 11. However, in an embodiment in which the temperature sensors 47 and the relative humidity sensor 49 are placed within the tape drive 10 where the environmental conditions have a known offset from the tape media 11, the temperature sensor 47 and the relative humidity sensor 49 of the tape drive measure the environment conditions and determine the read environment conditions using Equation 1, Equation 2 and Equation 3. For ease of description, whether the environment conditions of the tape 11 are directly measured by the temperature sensor 47 and relative humidity sensor 49, or determined based on the measurement of the temperature sensor 47 and relative humidity sensor 49 and a known offset of temperature, the measurements will be referred to herein as measured environment conditions. Further, the tape drive 10 environment conditions directly measured, or estimated based on measurements taken as a result of the tape drive 10 receiving a read command in step 804 will be referred to herein as the read environment conditions (e.g. a read temperature and a read relative humidity).

Accordingly, the tape drive 10 effectively measures the read environment conditions of the tape 11 when reading data from the portion of tape 11 by measuring the read environment conditions of the tape drive 10 upon receiving a read command in step 804. In one embodiment, the read environment conditions that the magnetic tape drive 10 measures as a result of receiving a read command includes at least one of the read temperature and read relative humidity of the tape drive 10 using a temperature sensor 47 and humidity sensor 49, respectively.

In one embodiment, the read environment conditions are measured upon mounting the tape cartridge 13 into the tape drive 10. In another embodiment, the read environment conditions may be measured just prior to unmounting the tape cartridge 13 from the tape drive 10. In one embodiment, the read environment conditions can be measured throughout the time that the tape cartridge 13 is mounted within the tape drive 10. For example, the read environment conditions, such as temperature and relative humidity, may be measured at regular intervals (e.g. every 30 seconds, every minute, or other unit of time) while the tape cartridge 13 is mounted with in the tape drive 10.

In step 806 the tape drive 10 determines if the read environment conditions are outside the operational range for reading data from the portion of tape. In one embodiment, the tape drive 10 determines if the read temperature is outside an operable temperature range and if the read relative humidity is outside an operable relative humidity range. In one embodiment, the operational temperature range is between 16° C. and 32° C. Further, in one embodiment the operational relative humidity range is between 20% and 80% relative humidity. In one embodiment, the operational temperature range and the operable relative humidity range is stored in code or microcode in control 25 of the tape drive 10. If the tape drive 10 determines in step 806 that either the read temperature or the read relative humidity is outside of the operable temperature range or relative humidity range, respectively, then in step 808 the tape drive 10 unmounts the tape. As discussed above, in extreme conditions, the temperature or relative humidity can be so high that the tape 11 becomes weaker and less rigid. When this happens, damage to the tape drive 10 and the tape media 11 can occur if the tape 11 remains within use in the tape drive 10. Accordingly, in one embodiment, as a result of measuring read environment conditions, such as a read temperature or a read relative humidity, and determining that the read environment conditions are not within the operable conditions, such as an operable temperature range or an operable relative humidity range, respectively, it is beneficial to unmount the tape cartridge 13 to avoid any damage to the tape cartridge 13 or the tape drive 10 in which it is mounted.

However, if in step 806 the tape drive 10 determines that the measured environment conditions are not outside the operational ranges, then the process proceeds to step 810. For example, if it the tape drive 10 determines that the read temperature is not outside the operational temperature range and the read relative humidity is not outside the operable relative humidity range, then the process proceeds to step 810. In step 810, the tape drive 10 determines if the read environment conditions are outside the user preferred range. For example, the tape drive determines if the read temperature is outside the user preferred range and if the read relative humidity is outside the user preferred relative humidity range. The user preferred temperature range and the user preferred relative humidity range are the temperature range and the relative humidity, respectively, that the user would like to operate within to achieve the best read and write performance. The user preferred temperature range and the user preferred relative humidity range are narrower ranges than the operable temperature range and the operable relative humidity ranges. In one embodiment, the user preferred temperature range and the user preferred relative humidity are stored in code or microcode in control 25 of tape drive 10. For example, in one embodiment, the user preferred temperature range is between 20° C. and 30° C. Further, in one embodiment the user preferred relative humidity range is between 30% and 50% relative humidity. It should be understood by one of ordinary skill in the art that the user preferred temperature range and the user preferred relative humidity ranges can be chosen by each user, and are not limited by the example ranges given above.

If the tape drive 10 determines in step 810 that any of the read environment conditions are outside the user preferred range, then in step 812 the tape drive 10 sends an error message. For example, if the tape drive 10 determines that either the read temperature or the read relative humidity is outside of the user preferred temperature range or the user preferred relative humidity range, respectively, then in step 812 the tape drive 10 returns an error message or status. The tape drive 10 may provide an error message or status by methods known in the art. One of ordinary skill in the art would understand, the tape drive may be part of a tape library (not shown), and in one embodiment, the error message may be displayed on a graphical user interface (GUI). Further, in one embodiment, the GUI may provide information about the error such as the read temperature or read relative humidity and the user preferred range of temperature and relative humidity.

If, however, in step 810, the tape drive 10 determines that none of the read environment conditions are outside the user preferred range, then the process proceeds to step 814. For example, if the tape drive 10 determines that the read temperature is not outside the user preferred temperature range and the read relative humidity is not outside the user preferred relative humidity range then the process proceeds to step 814. In step 814 the tape drive 10 attempts to perform the read command that was received in step 802. The process then proceeds to step 816. In step 816, the tape drive 10 determines if a read error has occurred. If the tape drive 10 determines that no read error has occurred, then the process proceeds to step 818. In step 818, the tape drive 10 performs the read command received in step 802.

However, if the tape drive 10 determines in step 816 that a read error has occurred, then the process continues to step 820. In step 820 the tape drive 10 obtains and compares the read environment conditions for the portion of tape being read against the write environment conditions for the same portion of tape. For example, in one embodiment, the tape drive 10 obtains and compares the read temperature measured in step 804 for the portion of tape against the write temperature measured and stored when the data was written to that same portion of tape (as described in one embodiment in steps 704 and 720 and FIG. 7). Similarly, in one embodiment, the tape drive 10 obtains and compares the read relative humidity measured in step 804 to the write relative humidity measured and stored when the data was written to that same portion of tape (as described in one embodiment in steps 704 and 720 and FIG. 7). In one embodiment, the write temperature and write relative humidity for that portion of tape is stored as described with respect to FIG. 7, FIG. 9B, and FIG. 10B. For example, the write temperature and write relative humidity are stored in the form of write environment conditions table 910 shown in FIG. 9B.

As described above, with respect to FIG. 7, the write temperature and write relative humidity may be stored to cartridge memory 21 within the tape cartridge 13. Therefore, in one embodiment, the tape drive 10 obtains the write temperature and write relative humidity from the cartridge memory 11 of the tape cartridge 13. As discussed above, in this embodiment, a memory interface 22 for reading information from, and writing information to, the cartridge memory 21 may be utilized. In one embodiment, the memory interface is a radio frequency identification tag (RFID tag) to read information from, and write information to cartridge memory 21, as known by those skilled in the art. However, one of ordinary skill in the art would understand that the write temperature and write relative humidity could be stored in another memory device or on the tape media 11 itself. In another embodiment, the tape drive 10 stores the write temperature and write relative humidity to a user area of the tape corresponding to the portion of tape that the data was written to. Accordingly, in this embodiment the tape drive 10 obtains the write temperature and write relative humidity from a user area corresponding to the portion of the tape.

For example, referring to FIGS. 9A and 9B, if the read command received in step 802 corresponds to a portion of tape 904 having an end of data block (EOD) at 120,000, then the tape drive 10 obtains the write temperature for that portion of tape from column 916 of the write environment conditions table 910 and the relative humidity from column 918. Referring to FIG. 9B, portion of tape 904 having an EOD block of 120,000 has a stored write temperature of 35° C. and a stored write relative humidity of 39%.

In step 822 the tape drive 10 determines if the read environment conditions measured in step 804 for reading a portion of tape are within a predetermined range of the write environment conditions stored for that same portion of tape. In one embodiment, the tape drive 10 determines if the read temperature measured in step 804 is within a predetermined temperature range of the write temperature stored for that same portion of tape in step 720. Further, in one embodiment, the tape drive 10 determines if the read relative humidity measured in step 804 is within a predetermined relative humidity range of the write relative humidity stored for that same portion of tape in step 720. As discussed above, if the read environment conditions are not within the predetermined range of the write environment conditions stored for the portion of tape, then there is an indication that the tape has expanded or contracted from the time it was written and may be the cause of the read error in step 816. In one embodiment, the write environment conditions can be measured throughout the time that the tape cartridge 13 is mounted within the tape drive 10. In one embodiment, the read environment conditions can be measured throughout the time that the tape cartridge 13 is mounted with in the tape drive. For example, the write environment conditions, such as write temperature and write relative humidity, and the read conditions such as the read temperature and read relative humidity, may be measured at regular intervals (e.g. every 30 seconds, every minute, or other unit of time) while the tape cartridge 13 is mounted within the tape drive 10. In this embodiment, the extremes such as maximum write temperature, $T_{max}$, minimum write temperature, $T_{min}$, maximum write relative humidity, $RH_{max}$, and minimum write relative humidity, $RH_{min}$, may be stored. Further, the write environment conditions can be measured throughout the time that the tape cartridge 13 is mounted within the tape drive 10 and the average temperature, $T_{avg}$ and the average relative humidity $RH_{avg}$ may be stored. Accordingly, in embodiments where the write environment conditions are measured at regular intervals and where the maximum, minimum, and/or average write conditions are stored, the tape drive 10 determines if the read environment conditions measured in step 804 for reading a portion of tape are within a predetermined range of the maximum, minimum and/or average write environment conditions stored for that same portion of tape 11. For example, the tape drive 10 determines if the read temperature is within a predetermined range of the maximum write temperature stored for that same portion of tape 11.

In one embodiment, the predetermined range may be 10% such that the read environment conditions must be within 10% of the write environment conditions. For example, in this embodiment, the read temperature measured in step 804 must be within 10% of the write temperature stored for the portion of tape to be within the 10% predetermined temperature range. Similarly, the read relative humidity measured in step 804 must be within 10% of the write relative humidity stored for portion of tape 904 to be within the 10% predetermined relative humidity range. While, in one embodiment, the predetermined percentage range may be 10%, one of ordinary skill in the art would understand that the user or manufacturer could choose any predetermined range such as 5%, 15% 20% etc. For example, a user may choose a smaller range if their tape drive 10 is susceptible to many environment extremes. Further, it should be understood that each environment condition may have a predetermined range set independent of the other. For example, the predetermined relative humidity range may be smaller than the predetermined temperature range as the change in humidity is a larger factor in expansion and contraction. Therefore, in one embodiment the predetermined temperature range may be set at 10% while the predetermined relative humidity range may be set at 5%. In this way the user may customize their requirements based on the environment conditions that they most often experience or are the most impactful.

To illustrate the process of FIG. 8, consider an embodiment in which the tape drive 10 receives a read command to read a portion of tape corresponding to portion of tape 904 shown in FIG. 9A. In step 804 the tape drive 10 measures the read environment conditions including a read temperature of 25° C. and a read relative humidity of 39%. In steps 806 and 810 the tape drive 10 determines that the read temperature and the read relative humidity are not outside the operational range or outside the user preferred range so the process proceeds to step 814. In steps 814 and 816, the tape drive attempts to perform the read command and determines that there is a read error. The tape drive 10 compares the read temperature of 25° C. and a read relative humidity of 39% measured in step 804 to the stored write temperature and stored write relative humidity for portion of tape 904. Referring to FIGS. 9A and 9B, portion of tape 904 having an EOD block of 120,000 has a stored write temperature of 35° C. and a stored write relative humidity of 39%. In step 822 the tape drive 10 determines if the read conditions measured in step 804 are within the predetermined range of the write conditions stored for portion of tape 904. For example, in step 822 the tape drive 10 determines if the read temperature measured in step 804 is within a predetermined temperature range of the write temperature stored for portion of tape 904. Similarly, in step 822 the tape drive 10 determines if the read relative humidity measured in step 804 is within the predetermined relative humidity range of the write relative humidity stored for portion of tape 904. In one embodiment the predetermined range may be a percentage such as 10%, however any predetermined range is contemplated. With respect to the temperature, in this example, the tape drive 10 determines that the read temperature of 25° C. is not within the predetermined range of 10% of the write temperature of 35° C. stored for portion of tape 904.

In step 822, if the tape drive 10 determines that one or more of the read environment conditions are not within the predetermined range of the write environment conditions stored for the portion of the tape 904, then the process proceeds to step 826. For example, in one embodiment, if the tape drive 10 determines that either the read temperature is not within a predetermined temperature range of the write temperature stored for the portion of tape 904 or that the read relative humidity is not within a predetermined relative humidity range of the write relative humidity stored for the portion of tape 904, then the process proceeds to step 826. Since the read environment conditions are not within the predetermined range of the write environment conditions stored for the portion of tape, there is an indication that there is possible expansion or contraction of the tape media 11 due to a change in environment conditions since the data was written to the tape.

In step 826, the tape drive 10 alters the handling of the tape 11 in response to determining either that the read temperature is not within the predetermined temperature range of the write temperature stored for the portion of tape 904, or that the read relative humidity is not within the predetermined relative humidity range of the write relative humidity stored for the portion of tape 904. In one embodiment, altering the handling of the tape 11 includes increasing or decreasing the tape tension. In another embodiment, altering the handling of the tape 11 includes offsetting the magnetic tape head system 65 up or down laterally with respect to the tape. Finally, in another embodiment, altering the handling of the tape 11 includes slowing down the tape movement across the magnetic tape head system 65.

For example, in an embodiment in which altering the handling of tape 11 includes increasing or decreasing the tape tension, the drive motor system 28 controls the relative pull between the tape reel's 14 motor (not shown) and the supply reel's 12 motor (not shown). Illustratively, if the tape drive 10 determines that the read relative humidity is not within the predetermined relative humidity range of the write relative humidity stored for that portion of tape, and the tape drive 10 determines that the read relative humidity is greater than the write relative humidity stored for the portion of tape, then it is likely that the tape 11 has expanded since the data was written to tape 11. Accordingly, the tape drive 10 alters the handling of tape 11 by increasing the tape tension. Similarly, if the tape drive 10 determines that the read temperature is not within the predetermined temperature range of the write temperature stored for that portion of tape, and the tape drive 10 determines that the read temperature is greater than the write temperature stored for the portion of tape, then it is likely that the tape 11 has expanded since the data was written to tape 11. Accordingly, the tape drive 10 alters the handling of tape 11 by increasing the tape tension.

If, however, the tape drive 10 determines that the read relative humidity is not within the predetermined relative humidity range of the write relative humidity stored for that portion of tape, and the tape drive 10 determines that the read relative humidity is less than the write relative humidity stored for the portion of tape, then it is likely that the tape 11 has contracted since the data was written to tape 11. Accordingly, the tape drive 10 alters the handling of the tape 11 by decreasing the tape tension. Similarly, if the tape drive 10 determines that the read temperature is not within the predetermined temperature range of the write temperature stored for that portion of tape, and the tape drive 10 determines that the read temperature is less than the write temperature stored for the portion of tape, then it is likely that the tape 11 has contracted since the data was written to tape 11. Accordingly, the tape drive 10 alters the handling of the tape 11 by decreasing the tape tension.

In one embodiment, altering the handling of the tape 11 includes offsetting the magnetic tape head system 65 up or down laterally with respect to the tape 11. In one embodiment, the control 25 determines whether to move the tape head system 65 up or down laterally with respect to the tape 11. Further, control 25 determines the distance to move the tape head system and whether to move the tape head system 65 up or down laterally with respect to the tape based on the location of the tape head system 65 with respect to the top tape edge and bottom tape edge of the tape and the amount of tape expansion or tape contraction. In one embodiment the amount of tape expansion or tape contraction can be determined based on the material of the tape media and the difference between the write environment conditions and the read environment conditions.

For example, if the tape drive 10 determines that the read relative humidity is not within the predetermined relative humidity range of the write relative humidity range, and the tape drive 10 determines that the read relative humidity is greater than the write relative humidity stored for the portion of tape, then it is likely that the tape 11 has expanded since the data was written to tape 11. If the data to be read is in a data track between a lateral midpoint of the tape and the top edge of the tape 11, then the tape dive alters the handling of tape 11 by offsetting the magnetic tape head system 65 laterally upwards.

Finally, in another embodiment, altering the handling of the tape 11 includes slowing down the tape movement across the magnetic tape head system 65. Lateral tape motion occurs during the movement of tape 11 across the tape head system 65 during both read and write operations. When data is written to a tape 11, the location of the data on the tape 11 is affected by the write environment conditions as well as the lateral motion of the tape 11 during the write. Further, when data is read back, the lateral motion of the tape 11 during the read is compounded with the lateral motion experienced and thus recorded during the write and the change in environment conditions since writing the data. Therefore, an embodiment of altering the handling of the tape 11 by slowing down the movement of the tape across the magnetic tape head system 65 can reduce the lateral motion of the tape 11, thus improving track following.

The tape drive 10 may use one or more of the methods of altering the handling of the tape described above in step 826 and may utilize them in any order or in combination, or in combination with other methods of error recovery handling. For example, the tape drive 10 may decrease the tension in the tape 11 in step 826 and attempt the read command 814, and upon receiving a read error again, offset the magnetic tape head system 65 in step 826. Alternatively, the tape drive may decrease the tension in the tape and offset the magnetic tape head system 65 in step 826, at substantially the same time, and prior to attempting the read command in step 814.

Returning to step 822, if the tape drive 10 determines that the read environment conditions are within the predetermined range of the write environment conditions for the portion of the tape, then the process proceeds to step 824. For example, in one embodiment, if the tape drive 10 determines that the read temperature is within a predetermined temperature range of the write temperature stored for the portion of tape, and that the read relative humidity is within a predetermined relative humidity range of the write relative humidity stored for the portion of tape, then the process proceeds to step 824. Accordingly, the read error is not a result in a difference between the read and write environment conditions. Therefore, in step 824, the tape drive 10 attempts alternative error recovery procedures that are known in the art.

As described with respect to FIG. 6, there are embodiments in which the tape 11 has shingled data, such that a write track partially overlaps a portion of previously written track. For example, as shown in FIG. 6, the data of data track 605 partially overlaps a portion of previously written data of data track 603. In an example where data track 603 is written in average relative humidity conditions such that the magnetic tape 11 has the a nominal lateral tape dimension and data track 605 is written in humid conditions such that the magnetic tape 11 is expanded, the data track 605 is written wider than normal and can overlap and squeeze data track 603. If the magnetic tape head system 65 subsequently attempts to read data on data track 603 in average relative humidity conditions, then data track 605 may overlap data track 603 enough to cause a read error when reading previously written data. Therefore, even when the read environment conditions are the same as the write environment conditions for a portion of tape, the shingled write environment conditions for the data that is shingled on the portion of tape may be significantly different than the read environment conditions such that a read error occurs. Accordingly, in an embodiments in which the data on the portion of tape to be read has additional data shingled thereon, the tape drive 10 compares not only the read environment conditions with the write environment conditions of the data on the portion of the tape to be read, but also compares the read environment conditions with the write environment conditions of the additional data that is shingled thereon (hereinafter referred to as the shingled write environment conditions). As discussed above, the tape directory, in combination with the stored write environment conditions table 910, 1010, not only provides the tape drive 19 with all of the necessary information to determine the portion of tape that particular data was written to and the environment conditions, but also provides the tape drive 19 with all of the necessary information to determine the write environment conditions stored for any data shingled and overlapping the portion of tape.

In particular, in step 820 of FIG. 8, the step of comparing the read environment conditions for the portion of tape to be read to the write environment conditions for the same portion of tape further includes comparing the read environment conditions for the portion of tape being read to the shingled write environment conditions for the portion of tape containing the additional shingled data that is parallel and overlapping the data of the portion of tape to be read. In one embodiment, the write temperature and write relative humidity for the data shingled and overlapping the portion of tape is stored as described with respect to FIG. 7, FIG. 9B, and FIG. 10B. For example, the shingled write temperature and shingled write relative humidity are stored in the form of write environment conditions table 910 shown in FIG. 9B or 1010 shown in FIG. 10B.

In step 820, in response to a command to read portion of tape 613, the tape drive 10 compares the read temperature measured in step 804 for the portion of tape 613 to the write temperature measured and stored when the data was written to that same portion of tape 613 (as described in one embodiment in steps 704 and 720 and FIG. 7). Further, in step 820, the tape drive 10 compares the read relative humidity measured in step 804 for portion of tape 613 to the write relative humidity measured and stored when the data was written to that same portion of tape 613. In addition, in embodiments where the data is shingled, the tape drive 10 compares the read temperature measured in step 804 for portion of tape 613 to the shingled write temperature measured and stored for the data shingled and overlapping the portion of tape 613. Further, the tape drive 10 also compares the read relative humidity measured in step 804 for portion of tape 613 to the shingled write relative humidity measured and stored for data shingled and overlapping the portion of tape 613. The data shingled and overlapping the portion of tape 613, as shown in FIG. 6 is portion of tape 615.

Accordingly, in step 822 the tape drive 10 determines if the read environment conditions measured in step 804 for reading the portion of tape 613 are within a predetermined range of the write environment conditions stored for that same portion of tape and also determines if the read environment conditions measured in step 804 for reading a portion of tape are within predetermined range of the shingled write environment conditions stored for the data shingled and overlapping that same portion of tape. In one embodiment, the tape drive 10 determines if the read temperature measured in step 804 for the portion of tape 613 is within a predetermined temperature range of the write temperature stored for that same portion of tape 613 in step 720. Further, in one embodiment, the tape drive 10 determines if the read relative humidity measured for the portion of tape 613 in step 804 is within a predetermined relative humidity range of the write relative humidity stored for that same portion of tape 613 in step 720. Still further, in one embodiment, the tape drive 10 determines if the read temperature measured in step 804 for the portion of tape 613 is within a predetermined temperature range of the shingled write temperature stored for the data shingled and overlapping that same portion of tape 613 in step 720. Finally, in one embodiment, the tape drive 10 determines if the read relative humidity measured in step 804 for the portion of tape 613 is within a predetermined relative humidity range of the shingled write relative humidity stored for the data shingled and overlapping that same portion of tape 613 in step 720. The data shingled and overlapping the portion of tape 613, as shown in FIG. 6 is portion of tape 615.

As discussed above, if the read environment conditions are not within the predetermined range of the write environment conditions stored for the portion of tape and for the data that is shingled and overlapping that same portion of tape, then there is an indication that the tape has expanded or contracted from the time it was written and may be the cause of the read error in step 816.

If it determined in step 822 that one or more of the read environment conditions are not within the predetermined range of the write environment conditions for the portion of tape or within the predetermined range of the write environment conditions for the data that is shingled and overlapping that same portion of tape, then the process proceeds to step 826. For example, in one embodiment, if the tape drive 10 determines that either the read temperature is not within a predetermined temperature range of the write temperature stored for the data that is shingled and overlapping the portion of tape, then the process proceeds to step 826.

In step 826, the tape drive 10 alters the handling of the tape 11 in response to determining at least one of the read temperature is not within the predetermined temperature range of the write temperature stored for the portion of tape, that the read relative humidity is not within the predetermined relative humidity range of the write relative humidity stored for the portion of tape, the read temperature is not within the predetermined temperature range of the shingled write temperature stored for the data shingled and overlapping the portion of tape, and the read relative humidity is not within the predetermined relative humidity range of the shingled write relative humidity stored for the data shingled and overlapping the portion of tape. As discussed above, in one embodiment, altering the handling of the tape 11 includes increasing or decreasing the tape tension. In another embodiment, altering the handling of the tape 11 includes offsetting the magnetic tape head system 65 up or down laterally with respect to the tape. Finally, in another embodiment, altering the handling of the tape 11 includes slowing down the tape movement across the magnetic tape head system 65.

If, however in step 822, the tape drive 10 determines that the read environment conditions are within the predetermined range of the write environment conditions for the portion of the tape and also within the predetermined range of the shingled write environment conditions for the data that is shingled and overlapping that same portion of tape, then the process proceeds to step 824. For example, in one embodiment, if the tape drive 10 determines that the read temperature is within a predetermined temperature range of the write temperature stored for the portion of tape, the read relative humidity is within a predetermined relative humidity range of the write relative humidity stored for the portion of tape, the read temperature is within a predetermined temperature range of the shingled write temperature stored for the data that is shingled and overlapping the portion of tape, and the read relative humidity is within a predetermined relative humidity range of the shingled write relative humidity stored for the data that is shingled and overlapping the portion of tape, then the process proceeds to step 824. Accordingly, the read error is likely not a result in a difference between the read and write environment conditions. In step 824, the tape drive 10 attempts alternative error recovery procedures that are known in the art.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In summary, described herein is embodiment of measuring and storing write environment conditions for a portion of tape as a result of receiving a write command to write data to the same portion of tape. In one embodiment, the write environment conditions are measured and stored each time a write command is received such that each portion of tape written has corresponding stored write environment conditions. The write environment conditions include temperature and relative humidity in one embodiment. The stored write environment conditions for each portion of tape written to create a historical log of the conditions that the tape was written within. The historical log can provide information to a manufacturer or user regarding the environmental conditions the user operates their tape drive within or may provide information to assist with failure analysis.

In one embodiment, the invention further includes determining if the write environment conditions are outside of an operational range. If it is determined that the write conditions are outside of the operational range, then the tape cartridge is unmounted to prevent damage to the tape drive and the tape Similarly, in one embodiment, the invention further includes determining if the write environment conditions are outside of a user preferred operational range. If it is determined that the write environment conditions are outside of the user preferred operational range, then the tape drive will alert the user with an error message.

What is claimed is:

1. A computer implemented method of storing write environment conditions of a tape cartridge mounted in a tape drive, the method comprising:
    receiving a command to write data to a portion of a tape of said tape cartridge;
    measuring a write temperature and a write relative humidity of said tape drive as a result of receiving said write command to write said data to said portion of said tape;
    writing said data to said portion of said tape;
    storing said write temperature and said write relative humidity to said tape cartridge as write environment conditions for said portion of said tape; and
    unmounting said tape cartridge in response to determining at least one of said write temperature and write relative humidity are outside an operable temperature range and an operable relative humidity range, respectively.

2. The computer implemented method of claim 1, wherein said storing of said write temperature and write relative humidity to said tape cartridge comprises storing said write temperature and write relative humidity to a cartridge memory within said tape cartridge.

3. The computer implemented method of claim 1, wherein said storing of said write temperature and write relative humidity to said tape cartridge comprises storing said write temperature and write relative humidity to a non-user area of said tape corresponding to said portion of said tape.

4. The computer implemented method of claim 1, wherein said storing of said write temperature and write relative humidity to said tape cartridge comprises storing said write temperature and write relative humidity in a write environment conditions table.

5. The computer implemented method of claim 4, further comprising collapsing said write environment conditions table.

6. The computer implemented method of claim 5, wherein collapsing said write environment conditions table includes removing redundant entries of environment write conditions, wherein a redundant environment write condition entry corresponds to a measured write temperature and write relative humidity entry that is within about 5% of another measured write temperature and write relative humidity.

7. The computer implemented method of claim 1, further comprising determining whether said write temperature and said write relative humidity are outside a preferred range in response to determining that said write temperature and said write relative humidity are within said operable temperature range and said operable relative humidity range, respectively, wherein said preferred temperature range is narrower than said operable temperature range, and wherein said preferred relative humidity range is narrower than said operable relative humidity range.

8. The computer implemented method of claim 7, further comprising sending an error message in response to determining that said write temperature and said write relative humidity are outside said preferred temperature range and said preferred relative humidity range, respectively.

9. The computer implemented method of claim 1, further comprising: measuring a write temperature and a write relative humidity at predetermined intervals during the time that said tape cartridge is mounted in said tape drive.

10. A tape drive comprising:
a head having a plurality of read and write elements for reading data from a tape of a tape cartridge mounted in the tape drive and writing data to the tape; and
a drive control system for moving the tape across the head;
wherein the tape drive is operative to:
receive a write command to write data to a portion of the tape;
measure a write temperature and a write relative humidity of the tape drive upon receipt of the write command;
measure a write temperature and a write relative humidity of the tape drive at predetermined intervals during the time the tape cartridge is mounted in the tape drive;
write the data to the portion of the tape;
store the following to the tape cartridge as write environment conditions for the portion of the tape:
the write temperature and the write relative humidity measured upon receipt of the write command,
a maximum and a minimum write temperature measured during the time the tape is mounted,
a maximum and a minimum write relative humidity measured during the time the tape is mounted, and
an average write temperature and an average write relative humidity calculated over the time the tape is mounted; and
unmount the tape cartridge in response to determining at least one of the write temperature and the write relative humidity are outside an operable temperature range and an operable relative humidity range, respectively.

11. The tape drive of claim 10, wherein the write environment conditions are stored to a cartridge memory within the tape cartridge.

12. The tape drive of claim 10, wherein the write environment conditions are stored to a user area of said tape corresponding to said portion of said tape.

13. The tape drive of claim 10, wherein the write environment conditions are stored in a write environment conditions table.

14. The tape drive of claim 13, further operative to clear the write environment conditions table as a result of writing data from a beginning of tape, where data is written to the tape in shingled data tracks.

15. A computer program product for storing write environment conditions of a tape cartridge mounted in a tape drive, the computer program product comprising a computer readable storage medium having program code embodied therewith, the program code executable by a processor to:
receive a write command to write data to a portion of a tape of the tape cartridge;
measure a write temperature and a write relative humidity of the tape drive as a result of receiving the write command;
write the data to the portion of the tape in a shingled format;
store the write temperature and the write relative humidity to the tape cartridge as write environment conditions for the portion of the tape; and
unmount the tape cartridge in response to determining at least one of the write temperature and the write relative humidity are outside an operable temperature range and an operable relative humidity range, respectively.

16. The computer program product of claim 15, wherein the storing of the write temperature and the write relative humidity to the tape cartridge comprises storing the write temperature and the write relative humidity to a cartridge memory within the tape cartridge.

17. The computer program product of claim 15, wherein the storing of the write temperature and the write relative humidity to the tape cartridge comprises storing the write temperature and the write relative humidity to a non-user area of the tape corresponding to the portion of the tape.

18. The computer program product of claim 15, wherein the storing of the write temperature and the write relative humidity to the tape cartridge comprises storing the write temperature and the write relative humidity in a write environment conditions table.

19. The computer program product of claim 18, further operative to determine whether the write temperature and the write relative humidity are outside a preferred range in response to determining that the write temperature and the write relative humidity are within the operable temperature range and the operable relative humidity range, respectively, wherein the preferred temperature range is narrower than the operable temperature range, and wherein the preferred relative humidity range is narrower than the operable relative humidity range.

20. The computer program product of claim 18, further operative to send an error message in response to determining that the write temperature and the write relative humidity are outside the preferred temperature range and the preferred relative humidity range, respectively.

* * * * *